(12) United States Patent
Aoki

(10) Patent No.: US 8,947,990 B2
(45) Date of Patent: Feb. 3, 2015

(54) TAPE DEVICE AND METHOD OF CONTROLLING TAPE DEVICE

(71) Applicant: Fujitsu Limited, Kawasaki (JP)

(72) Inventor: Shigeharu Aoki, Edogawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/747,555

(22) Filed: Jan. 23, 2013

(65) Prior Publication Data

US 2013/0242713 A1 Sep. 19, 2013

(30) Foreign Application Priority Data

Mar. 19, 2012 (JP) ................................. 2012-062652

(51) Int. Cl.
  *G11B 5/58* (2006.01)
  *G11B 27/36* (2006.01)
  *G11B 27/11* (2006.01)
(52) U.S. Cl.
  CPC .............. *G11B 27/36* (2013.01); *G11B 27/11* (2013.01); *G11B 2220/90* (2013.01)
  USPC ...................................................... 369/53.41
(58) Field of Classification Search
  USPC .............................................. 369/53.2, 53.41
  See application file for complete search history.

(56) References Cited

U.S. PATENT DOCUMENTS

| | | | | |
|---|---|---|---|---|
| 5,502,694 A | * | 3/1996 | Kwoh et al. | 369/25.01 |
| 5,634,032 A | * | 5/1997 | Haddock | 711/112 |
| 6,138,203 A | | 10/2000 | Inokuchi et al. | |
| 6,915,374 B2 | * | 7/2005 | Pereira | 711/5 |
| 6,930,967 B2 | * | 8/2005 | Suzuki et al. | 369/53.41 |
| 8,576,675 B2 | * | 11/2013 | Shimoda | 369/30.07 |
| 2004/0160873 A1 | * | 8/2004 | Pereira | 369/47.53 |
| 2005/0024994 A1 | * | 2/2005 | Shah et al. | 369/30.1 |
| 2005/0030860 A1 | * | 2/2005 | Gage et al. | 369/47.53 |
| 2005/0237865 A1 | * | 10/2005 | Ando et al. | 369/30.3 |
| 2007/0076535 A1 | * | 4/2007 | Weirauch | 369/30.04 |
| 2008/0082310 A1 | * | 4/2008 | Sandorfi et al. | 703/23 |
| 2010/0039915 A1 | * | 2/2010 | Ueda et al. | 369/53.21 |
| 2010/0280651 A1 | * | 11/2010 | Edling et al. | 700/214 |
| 2011/0157742 A1 | * | 6/2011 | Thompson et al. | 360/92.1 |
| 2012/0284467 A1 | * | 11/2012 | Bish et al. | 711/154 |

FOREIGN PATENT DOCUMENTS

| | | | |
|---|---|---|---|
| JP | 2007-104006 | | 4/2007 |
| JP | 2007104006 A | * | 4/2007 |
| WO | WO-97/17652 | | 5/1997 |

* cited by examiner

*Primary Examiner* — Brenda Bernardi
(74) *Attorney, Agent, or Firm* — Fujitsu Patent Center

(57) ABSTRACT

A tape device includes a storage unit, a measuring unit, a calculating unit, and an updating unit. The storage unit stores management information in which an identifier of a medium and a data volume further recordable on the medium are in association with each other. The measuring unit measures a data volume written in the medium or a data volume read out of the medium. The calculating unit calculates a data volume recorded in the medium from a total of the data volume measured by the measuring unit, acquires a recorded medium length, and calculates the data volume further recordable on the medium based on the data volume recorded in the medium and the recorded medium length. The updating unit updates the management information stored in the storage unit with the data volume further recordable on the medium which is calculated by the calculating unit.

7 Claims, 21 Drawing Sheets

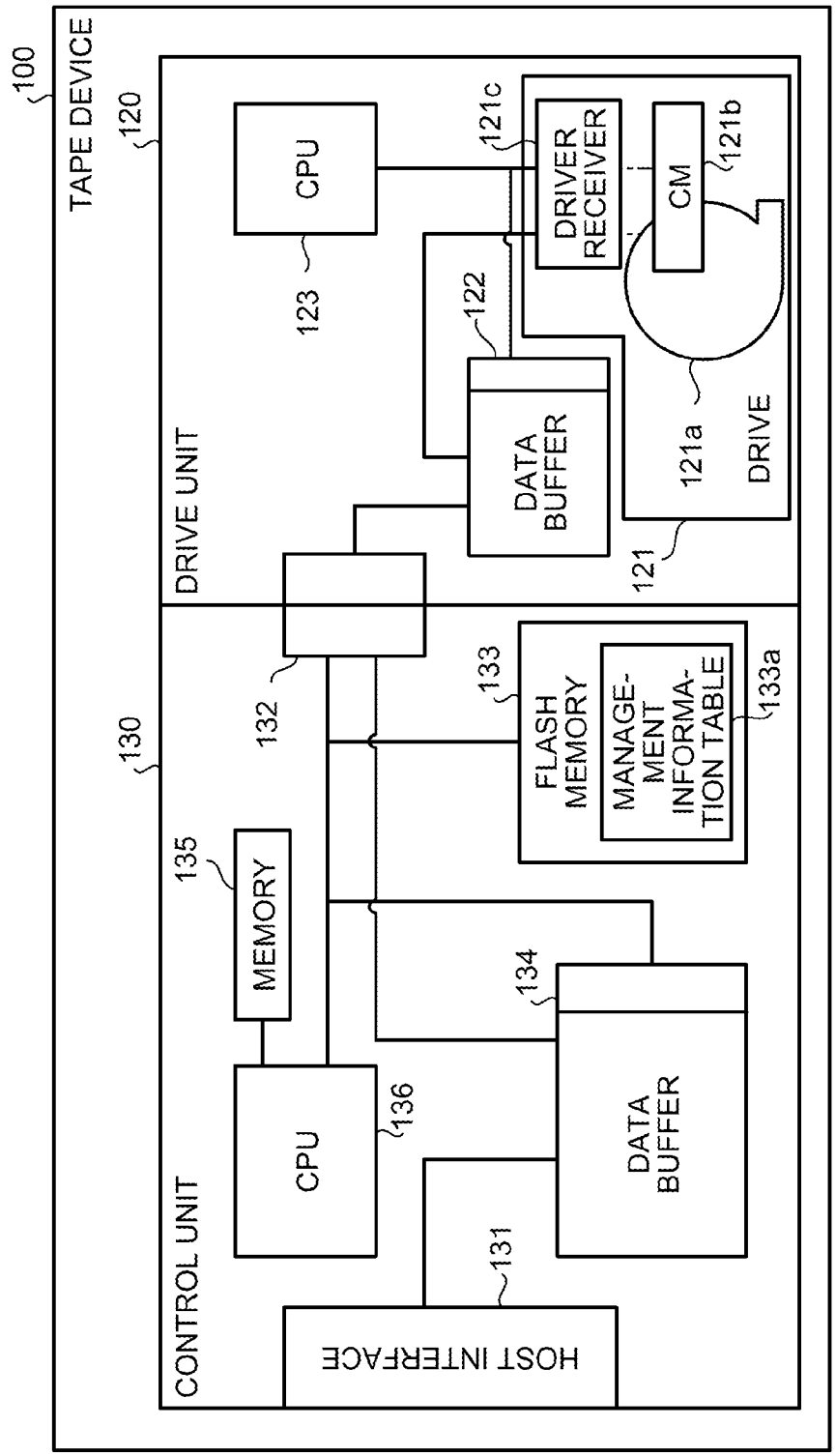

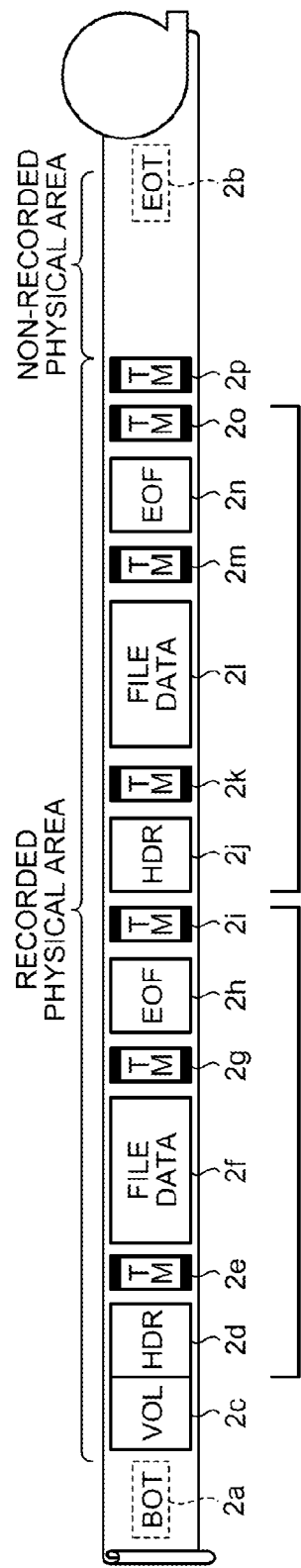

FIG.3

| x-COLUMN y-COLUMN | 0000 | 0008 | 0016 | 0024 | 0032 | 0040 3 PIECES | 0048 | ... | 9997 PIECES | | | 159,976 BYTE | 159,984 BYTE | 159,992 BYTE |
|---|---|---|---|---|---|---|---|---|---|---|---|---|---|---|
| 00000 | VOL NAME | HDR NAME | DATA VOLUME | HDR NAME | DATA VOLUME | HDR NAME | DATA VOLUME | ... | HDR NAME | ALL 0 | ALL 0 | TOTAL RECORDED CAPACITY | RECORDED PHYSICAL POSITION | NON-RECORDED CAPACITY |
| 27100 | VOL NAME | HDR NAME | DATA VOLUME | HDR NAME | DATA VOLUME | ALL 0 | | | | | | TOTAL RECORDED CAPACITY | RECORDED PHYSICAL POSITION | NON-RECORDED CAPACITY |
| 4E200 | VOL NAME | HDR NAME | DATA VOLUME | ALL 0 | | | | | | | | TOTAL RECORDED CAPACITY | RECORDED PHYSICAL POSITION | NON-RECORDED CAPACITY |
| 75300 | VOL NAME | HDR NAME | DATA VOLUME | HDR NAME | DATA VOLUME | ALL 0 | ALL 0 | | | | | TOTAL RECORDED CAPACITY | RECORDED PHYSICAL POSITION | NON-RECORDED CAPACITY |
| 9C400 | VOL NAME | HDR NAME | DATA VOLUME | HDR NAME | DATA VOLUME | HDR NAME | DATA VOLUME | | ALL 0 | | | TOTAL RECORDED CAPACITY | RECORDED PHYSICAL POSITION | NON-RECORDED CAPACITY |
| C3500 | VOL NAME | HDR NAME | DATA VOLUME | ALL 0 | ALL 0 | | | | | | | TOTAL RECORDED CAPACITY | RECORDED PHYSICAL POSITION | NON-RECORDED CAPACITY |
| ... 26E8F00 (100 VOLUMES) | | | | | | | | | | | | | | |

133a

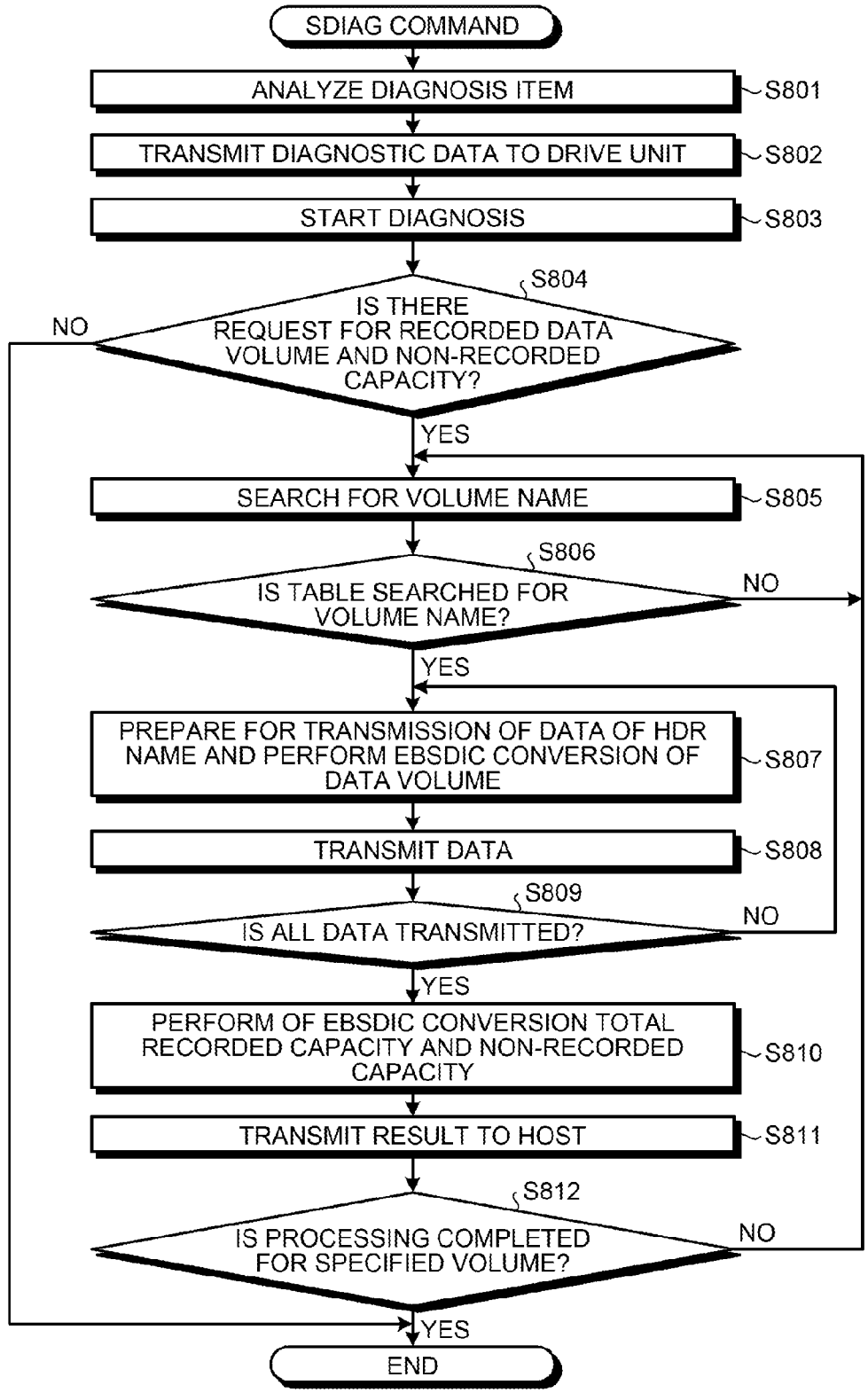

TAPE DEVICE AND METHOD OF CONTROLLING TAPE DEVICE

CROSS-REFERENCE TO RELATED APPLICATION

This application is based upon and claims the benefit of priority of the prior Japanese Patent Application No. 2012-062652, filed on Mar. 19, 2012, the entire contents of which are incorporated herein by reference.

FIELD

The embodiments discussed herein are related to a tape device and a method of controlling the tape device.

BACKGROUND

Conventionally, in an LTO (Linear Tape-Open) device used by a general purpose computer system, when additionally recording data on a cartridge medium, a data volume recordable on the cartridge medium is managed.

For example, application software installed in a general purpose computer system reads data of an End-Of-Volume label recorded on a cartridge medium, and calculates a non-recorded data volume from the nominal maximum recording volume of the cartridge medium, and a data volume read from the cartridge medium.

Alternatively, an operator himself/herself loads a cartridge medium on a tape drive, reads a data volume currently recorded in a CM (Cartridge Memory), calculates a recorded data volume and a non-recorded data volume, and creates a history book of the cartridge medium.

Patent Document 1: International Publication Pamphlet No. WO 97/17652
Patent Document 2: Japanese Laid-open Patent Publication No. 2007-104006

However, the problem with the conventional technology is that it is difficult to manage the non-recorded data volume of the cartridge medium efficiently.

Specifically, all the methods of the conventional technology adopt a technique of loading the cartridge medium on the tape drive. For this reason, time to load the cartridge medium on the tape drive occurs whenever calculating the non-recorded data volume.

SUMMARY

According to an aspect of an embodiment, a tape device includes a storage unit that stores management information in which an identifier of a medium and a data volume further recordable on the medium are in association with each other; a measuring unit that measures a data volume written in the medium or a data volume read out of the medium according to execution of an input/output command; a calculating unit that calculates a data volume recorded on the medium from a total of the data volume measured by the measuring unit, acquires a recorded medium length, which represents a length of the medium up to an end position of the data written in or read out of the medium by the execution of the input/output command from a beginning position of the medium, from a drive to which the medium is mounted, and calculates the data volume further recordable on the medium, based on the recorded data volume and the recorded medium length; and an updating unit that updates the management information stored in the storage unit with the data volume further recordable on the medium calculated by the calculating unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a hardware configuration of a tape device according to a first embodiment;

FIG. 2 is a diagram illustrating an example of data format of a cartridge medium;

FIG. 3 is a diagram illustrating an example of information which is stored in a management information table;

FIG. 21 is a flowchart illustrating the procedure of SDIAG command processing performed by the tape device according to the first embodiment.

DESCRIPTION OF EMBODIMENTS

Figure 4:
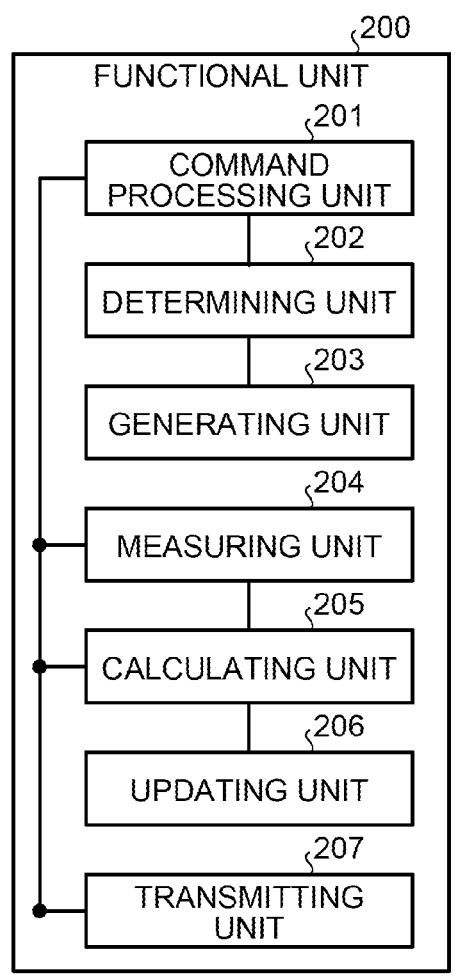
FIG. 4 is a functional block diagram illustrating a functional configuration of functional units of software executed by a CPU of the tape device according to the first embodiment.

Preferred embodiments of the present invention will be explained with reference to accompanying drawings.

The invention is not limited to the embodiments. Moreover, each of the embodiments may be suitably combined as long as the contents of processing thereof are not contradictory.

[a] First Embodiment

Hardware Configuration of Tape Device According to First Embodiment

FIG. 1 is a diagram illustrating an example of a hardware configuration of a tape device according to a first embodiment. As illustrated in FIG. 1, a tape device 100 according to the first embodiment includes a drive unit 120 and a control unit 130. The tape device 100 according to the first embodiment is connected to a host (not illustrated). The term "host" herein means an information processor, such as a server and a general purpose computer system, such as a mainframe.

The drive unit 120 includes a drive 121, a data buffer 122, and a CPU (Central Processing Unit) 123.

The drive 121 includes a cartridge medium 121a, a CM (Cartridge Memory) 121b, and a driver receiver 121c. The drive 121 writes data in the cartridge medium 121a which is set, and reads stored data by causing the cartridge medium 121a to run.

The cartridge medium 121a is a magnetic tape, for example. The data format of the cartridge medium 121a will be described below. The CM 121b stores a recording position in the cartridge medium 121a. The term "recording position" herein means the position of a head after writing or reading data is executed. That is, the recording position implies the length of a magnetic tape up to the end position of the cartridge medium 121a from the beginning position of the cartridge medium 121a after writing data or reading data is executed. The unit of the recording position is a sector value. The driver receiver 121c is an interface between the data buffer 122 and the CPU 123.

The data buffer 122 stores temporarily the data read from the cartridge medium 121a, and the data to be written in the cartridge medium 121a.

The CPU 123 specifies an address of the data buffer 122 and controls writing and reading of data in and from the cartridge medium 121a.

The control unit 130 includes a host interface 131, a drive interface 132, a flash memory 133, a data buffer 134, a memory 135, and a CPU 136, and controls the drive unit 120 according to the request from the host.

The host interface 131 is an interface that interfaces with the host, and it controls exchange of data with the host as well as it receives various commands from the host.

The drive interface 132 is an interface between the control unit 130 and the drive unit 120.

The flash memory 133 stores a management information table 133a in which an identifier of a cartridge medium and a data volume further recordable on the cartridge medium. The details of the management information table 133a are described below using FIG. 3.

The data buffer 134 stores temporarily data to be exchanged between the host and the drive unit 120.

The memory 135 is a semiconductor memory device, such as RAM (Random Access Memory), and stores various kinds of programs to be executed by the CPU, for example. The memory 135 stores status flags of the tape device 100.

The CPU 136 controls exchange of data between the host and the drive unit 120 according to the commands received from the host.

Such a tape device 100 measures a data volume read from the cartridge medium or a data volume written in the cartridge medium according to execution of the command. The tape device 100 calculates a data volume recorded on the cartridge medium from the total of the measured data volume. The tape device 100 acquires, from the drive to which the cartridge medium is mounted, a recorded medium length which represents the length of the cartridge medium from the beginning position of the cartridge medium up to the end position of the data written in or read out by execution of the command. Then, the tape device 100 calculates a data volume further recordable on the cartridge medium based on the recorded data volume and the recorded medium length. In addition, the tape device 100 updates the management information table 133a with the data volume further recordable on the cartridge medium which is calculated.

Data Format of Cartridge Medium

Next, data format in a cartridge medium is described using FIG. 2. FIG. 2 is a diagram illustrating an example of the data format in a cartridge medium. As illustrated in FIG. 2, BOT (Beginning Of Tape) 2a and EOT (End Of Tape) 2b are recorded at both ends of the cartridge medium. As illustrated in FIG. 2, a VOL (Volume) 2c, HDRs (headers) 2d and 2j, file data 2f and 2l, EOFs (End Of Files) 2h and 2n, TMs (Tape Marks) 2e, 2g, 2i, 2k, 2m, 2o, and 2p are recorded in the cartridge medium.

Here, the BOT 2a is a mark which represents the beginning of the cartridge medium. The EOT 2b represents the end of the cartridge medium. In addition, in the cartridge medium, information can be recorded in an area between the BOT 2a and the EOT 2b.

The VOL 2c is a volume area in which an identification label of a user or a cartridge medium is recorded. The size of the VOL 2c is 80 bytes, and the VOL is given a VOL name of 8 bytes. One VOL 2c is recorded for each cartridge medium.

The HDRs 2d and 2j are header areas to record labels which are used to identify file data. The size of the HDRs 2d and 2j is 80 bytes, and each of the HDRs 2d and 2j is given a DHR name of 8 bytes.

The file data 2f and 2l represent data which is variable in data and byte by a user. The EOFs 2h and 2n represent the end of the file data. The size of the EOFs 2h and 2n is 80 bytes, and each of the EOFs 2h and 2n is given an end data name of 8 bytes. The TMs 2e, 2g, 2i, 2k, 2m, 2o and 2p are special codes or code sequences which are recorded to control reading/writing of data on the cartridge medium. The TMs 2e, 2g, 2i, 2k, 2m, 2o and 2p represent the boundaries between the file data 2f and 2l and the labels or label groups such as the HDRs 2d and 2j and the EOFs 2h and 2n.

In addition, in the cartridge medium, HDR, TM, file data, TM, EOF, and TM constitutes one data write unit. In the example illustrated in FIG. 2, the HDR 2d, the TM 2e, the file data 2f, the TM 2g, the EOF 2h, and the TM 2i constitute one data write unit, and the HDR 2j, the TM 2k, the file data 2l, the TM 2m, the EOF 2n, and the TM 2o constitute one data write unit. When two TMs are written continuously in the cartridge medium, it means the end of writing. In the example illustrated in FIG. 2, when the TM 2p is written behind the TM 2o, it means the end of writing.

Management Information Table

Next, information stored in the management information table is described using FIG. 3. FIG. 3 is a diagram illustrating an example of the information stored in the management information table. As illustrated in FIG. 3, a management information table 133a includes addresses in x column and y column, and 8-byte storage areas are provided for the x column. In addition, in the management information table 133a, each y-column address is associated with a "VOL name", an "HDR name", and a "data volume", a "total recorded capacity", a "recorded physical position" and a "non-recorded capacity".

Here, the "VOL name" stored in the management information table 133a is a volume name given to a VOL, and represents an identifier of a cartridge medium. The "HDR name" stored in the management information table 133a represents the header name of the file data. The "data volume" stored in the management information table 133a represents the data volume of one data write unit corresponding to the last HDR name, and contains byte counts of the HDR, the TM, the file data, the TM, the EOF, and the TM. The "total recorded capacity" stored in the management information table 133a represents total data volume recorded in a medium. The total recorded capacity is calculated by adding the volume of the VOL to the total of the data volume corresponding to the VOL name. The unit of the total recorded capacity is byte. "The recorded physical position" stored in the management information table 133a represents the position of a head in the cartridge medium mounted to the drive, and is expressed as a sector value. This "recorded physical position" represents the recorded medium length which is the length of the cartridge medium up to the end position of the data written in or read out by the execution of the command from the beginning position of the cartridge medium. "The non-recorded capacity" stored in the management information table 133a represents a data volume which is further recordable on a medium. The unit of the non-recorded capacity is a byte.

Here, the stored information is generated by a generating unit 203 described below, and is suitably updated by an updating unit 206 described below. The information illustrated in FIG. 3 is only an example. The information is not limited to the example and can be arbitrarily set and changed. For example, in the management information table 133a, only the "VOL name" and the "non-recorded capacity" may be associated with each other and stored.

Functional Configuration of Software Executed by CPU of Tape Device According to First Embodiment Next, the functional configuration of the software executed by the CPU of the tape device according to the first embodiment is described using FIG. 4. FIG. 4 is a functional block diagram illustrating the functional configuration of functional units of software executed by the CPU of the tape device according to the first embodiment.

As illustrated in FIG. 4, a functional units 200 of the software executed by the CPU 136 of the tape device 100 according to the first embodiment include a command processing unit 201, a determining unit 202, a generating unit 203, a measuring unit 204, a calculating unit 205, an updating unit 206, and a transmitting unit 207.

The command processing unit 201 executes processing of various kinds of commands received from the host. For example, the command processing unit 201 reads a byte count from a WT command, and executes processing according to the read byte count and the status flag of tape device 100. The command processing unit 201 acquires a transmission byte count from the drive unit 120, and executes processing according to the acquired byte count and the status flag of the tape device 100.

Next, an example of one kind of command executed by the command processing unit 201 is described. For example, the command processing unit 201 executes the WT (Write) command, a WTM (Write Tape Mark) command, an RD (Read) command, an RWD (Rewind) command, etc. The command processing unit 201 executes an SP (Space Block) command, an SPF (Space File) command, a BSP (Back Space Block) command, a BSPF (Back Space File) command, etc.

The WT command is a command of writing data. The WTM command is a command of writing TM. The RD command is a command of reading data. The RWD command is a command of positioning a head at the beginning of a cartridge medium. The SP command is a command of moving a block forward by one unit. The SPF command is a command of moving a file interposed between TMs by one unit. The BSP command is a command of moving a block backward by one unit. The BSPF command is a command of moving a file interposed between TMs backward by one unit. The processing procedure of each kind of command is described below.

The determining unit 202 determines whether a cartridge medium is an unused one, based on the presence or absence of information containing an identifier of the cartridge medium when the cartridge medium is mounted. Here, when the cartridge medium is an unused one, the determining unit 202 instructs the generating unit 203 described below to generate a management information table 133a.

When it is determined that the cartridge medium is not an unused one, the determining unit 202 determines whether a VOL name which is the same as the VOL name written in the management information table 133a exists during an idling routine executed after the end of the WT command processing. For example, the determining unit 202 reads the identifier of the cartridge medium from the cartridge medium and searches for a management information table 133a which matches the read identifier of the cartridge medium. Here, when there is no management information table 133a which matches the read identifier of the cartridge medium, the determining unit 202 notifies so that the generating unit 203 will generate the management information table 133a.

The generating unit 203 executes processing described below when the determining unit 202 determines that the cartridge medium is an unused one. That is, the generating unit 203 generates a management information table 133a in which an identifier of a cartridge medium, data volume recorded on the cartridge medium, and data volume further recordable on the cartridge medium are associated with each other. For example, when the same VOL name does not exist, the generating unit 203 determines a y-column address of the management information table 133a, and records a new VOL name in the management information table 133a.

When the result of the searching by the determining unit 202 reveals that there is no management information table 133a which matches with the read identifier of the cartridge medium, the generating unit 203 generates a management information table 133a in which the identifier of the cartridge medium, data volume recorded on the cartridge medium, and data volume further recordable on the cartridge medium are associated with each other.

The measuring unit 204 measures the volume of data read from the cartridge medium or the volume of data written in the cartridge medium according to execution of an input/output command. The measuring unit 204 saves the measured data volume in the memory 135.

The calculating unit 205 calculates the data volume recorded on the cartridge medium from the total of the data volume measured by the measuring unit 204 and acquires the recording position of the cartridge medium from the drive to which the cartridge medium is mounted. Then, the calculating unit 205 calculates the data volume further recordable on the cartridge medium, based on the recorded data volume and the recorded medium length.

For example, when the input/output command is executed and when end information representing completion of writing of data is written in or read out, the calculating unit 205 calculates the total recorded capacity which is the total of the data volume recorded on the cartridge medium. The calculating unit 205 reads the recorded physical position which represents the recorded tape length from the CM 121b.

Then, the calculating unit 205 calculates the data volume further recordable on the cartridge medium, based on the recorded data volume and the recorded medium length. Then, the calculating unit 205 calculates the data volume further recordable on the cartridge medium from the recorded data volume per unit length of the cartridge medium and the length of a non-recorded portion of the cartridge medium.

The updating unit 206 updates the management information table 133a stored in the flash memory 133 using the data volume recorded on the cartridge medium calculated by the calculating unit 205, and the data volume further recordable on the cartridge medium.

The updating unit 206 executes processing described below when the result of the searching by the determining unit 202 reveals that there is a management information table 133a which matches the read identifier of the cartridge medium. That is, the updating unit 206 updates the management information table 133a with the data volume recorded on the cartridge medium calculated by the calculating unit 205, and the data volume further recordable on the cartridge medium.

When a VOL name is specified and an acquisition request of the management information table 133a is received from the host, the transmitting unit 207 reads the management information table 133a of the corresponding VOL name from the flash memory 133, and transmits it to the host. For example, when the SDIAG command is received, the transmitting unit 207 performs EBSDIC (Extended Binary Coded Decimal Interchange Code) conversion of the total recorded capacity and the non-recorded capacity, and transmits the result to the host. The conversion of the data at the time of transmitting to the host is not limited to the EBSDIC.

Access Operation to Cartridge Medium by Tape Device

Figure 5:
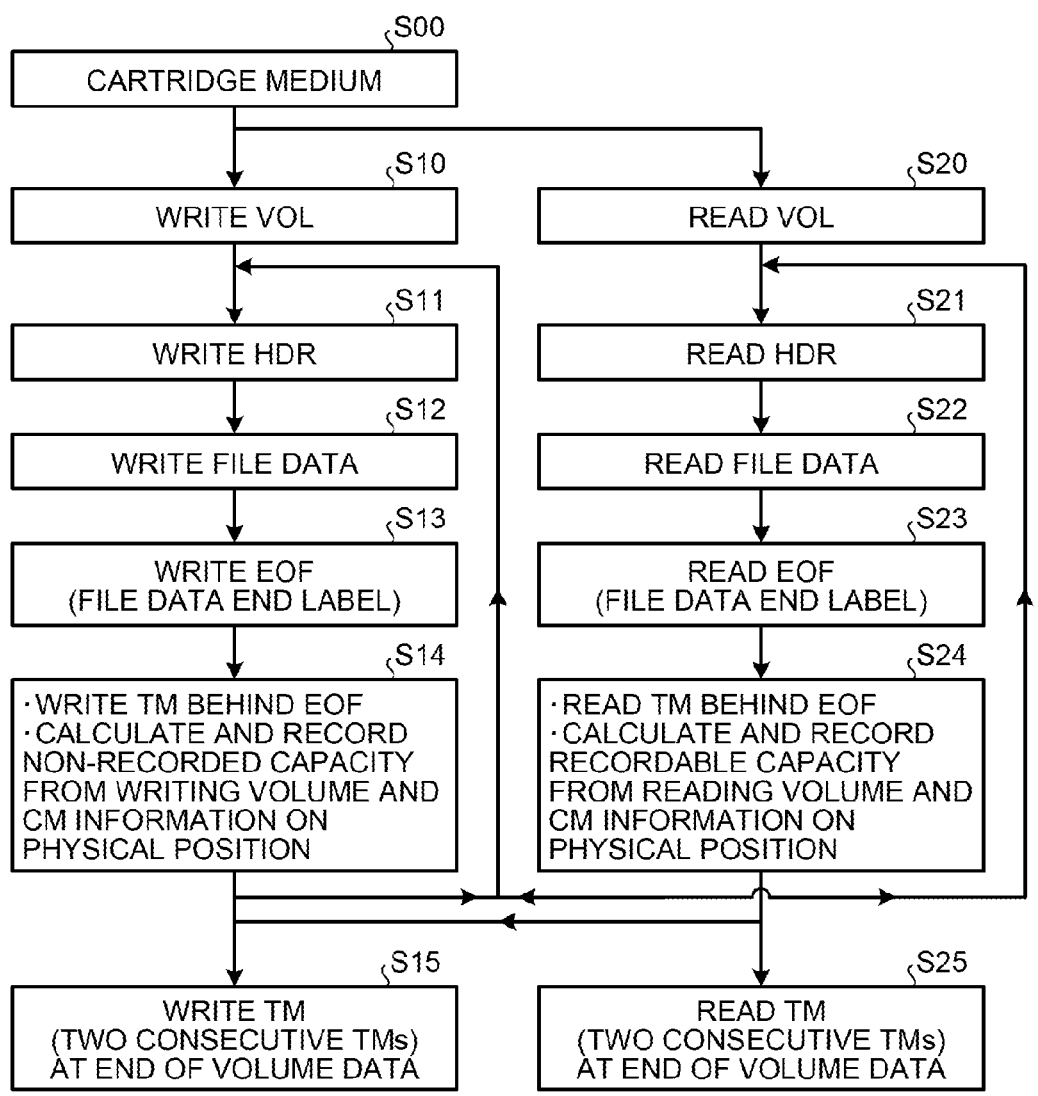
FIG. 5 is a diagram illustrating an example of operation of a tape device when accessing a cartridge medium.

Next, the access operation to the cartridge medium by the tape device 100 is described using FIG. 5. FIG. 5 is a diagram illustrating an example of operation of the tape device when the tape device accesses a cartridge medium. Here, a writing operation and a reading operation with respect to a cartridge medium performed by the tape device 100 are described. The access operation is managed by using the status flags stored in the memory 135.

Writing Operation

When the status flag is 10, the tape device 100 writes a VOL of 80 bytes at the beginning of a cartridge medium when an unused cartridge medium is mounted to the drive 121 (S10). Although user data is written behind the VOL on file basis, the tape device 100 executes the writing by repeating operations of status flags of 11 through 14 described below.

When the status flag is 11, the tape device 100 writes an HDR of 80 bytes so as to be continuous to the VOL, and writes a TM behind that (S11). The tape device 100 writes the user data of an arbitrary data length so as to be continuous to the HDR and the TM when the status flag is (S12).

When the status flag is 13, the tape device 100 writes a TM and an EOF of 80 bytes so as to be continuous to the user data, and then writes a TM behind that (S13). When the status flag is 14, the tape device 100 writes a TM in order to represent the end of a tape when the tape device 100 finishes writing one file (S14).

In this way, since the tape device 100 writes the EOF and TM when the status flag is 13, the end of the tape can be detected by checking the presence of the TM written under the state of the status flag of 14 and the TM subsequent to the EOF and the TM. When additionally writing file data in the tape, the tape device 100 eliminates the last TM after detecting the end of the tape, and then repeatedly executes the operations of the status flags of 11 to 14.

Reading Operation

When the status flag is 20, the tape device 100 reads the VOL of 80 bytes at the beginning of a cartridge medium when a used CMT is mounted (S20). The tape device 100 reads the HDR and the TM of first file data after reading the VOL when the status flag is 21 (S21).

The tape device 100 reads the user data of an arbitrary data length when the status flag is 22 (S22). The tape device 100 reads the TM, the EOF, and the TM after completely reading the user data when the status flag is 23 (S23). The tape device 100 reads the TM when it comes to the end of the tape when the status flag is 24 (S24). When there is a next file, the tape device 100 repeats the execution of the operations of the status flags of 21 through 23.

Processing Operation Performed by Tape Device According to First Embodiment

Figure 6:
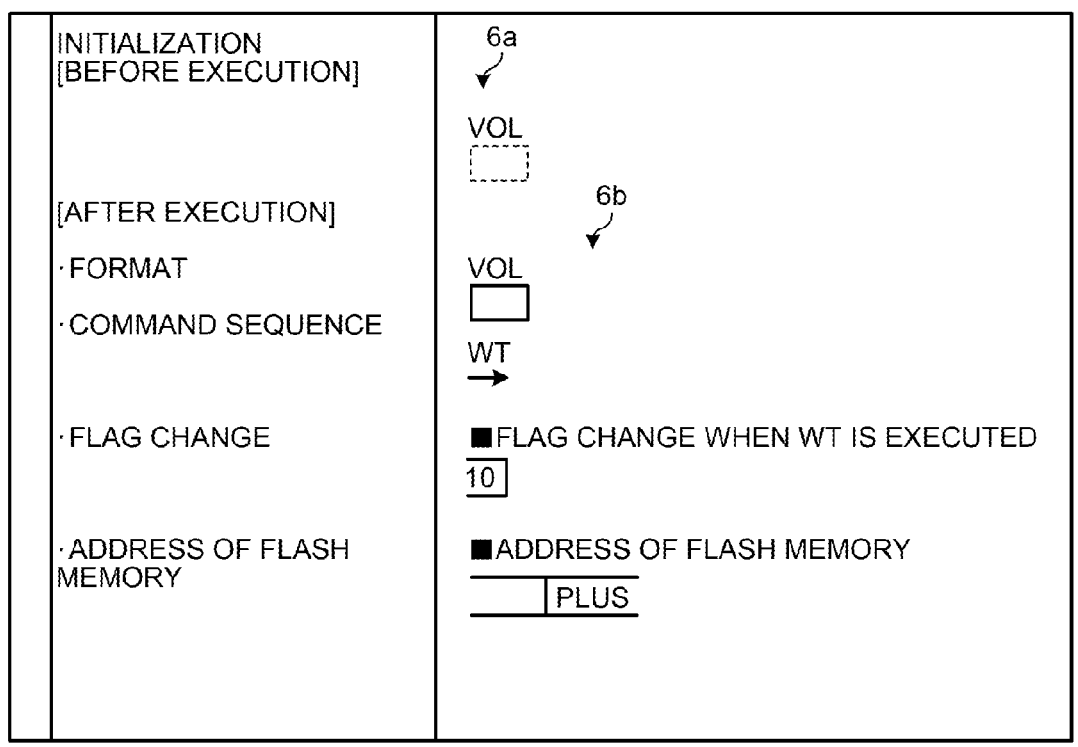
FIG. 6 is a diagram illustrating an example of a processing operation of initialization processing.
Figure 7:
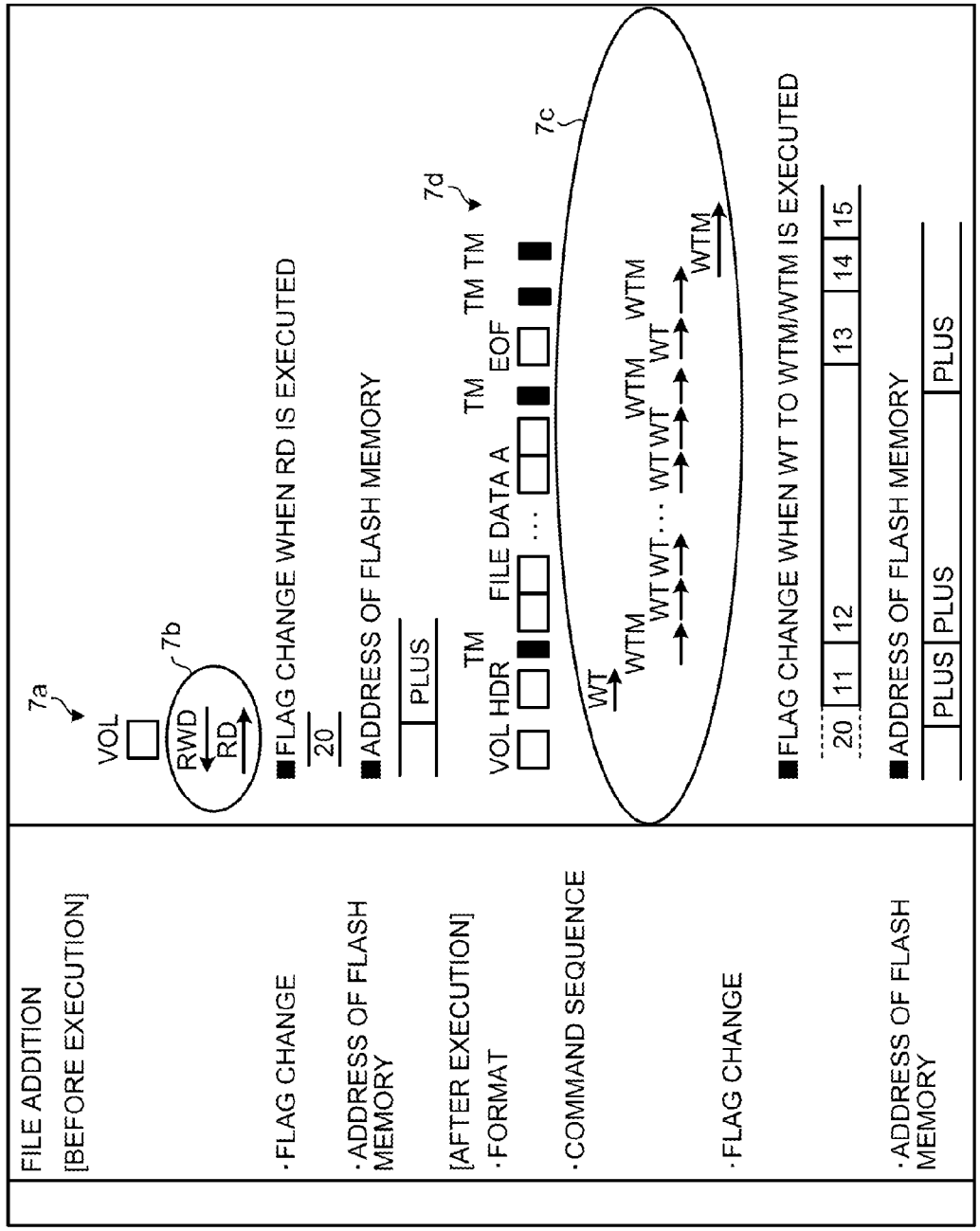
FIG. 7 is a diagram illustrating an example of a processing operation of file addition processing.
Figure 8:
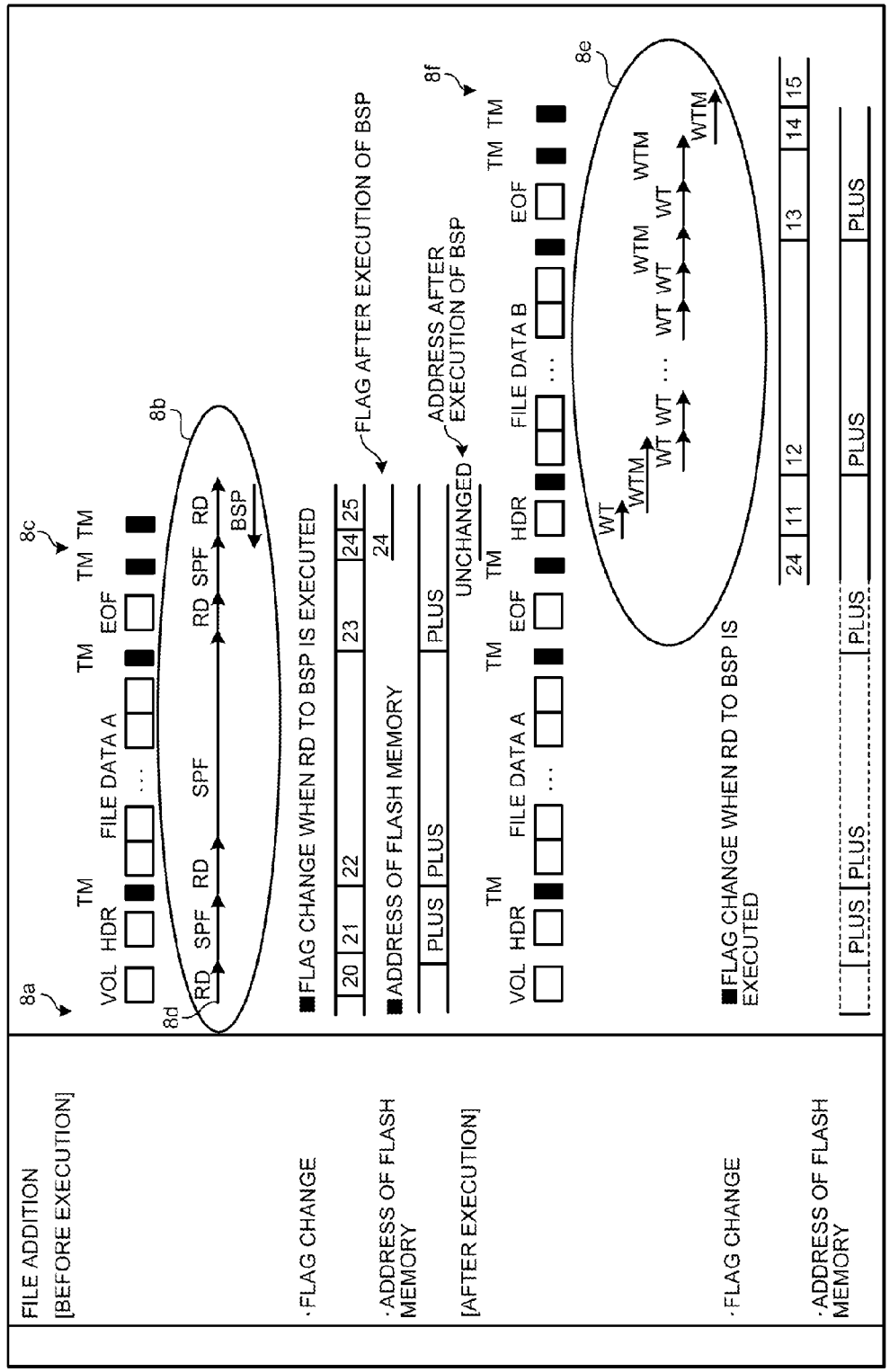
FIG. 8 is a diagram illustrating an example of a processing operation of file addition processing.
Figure 9:
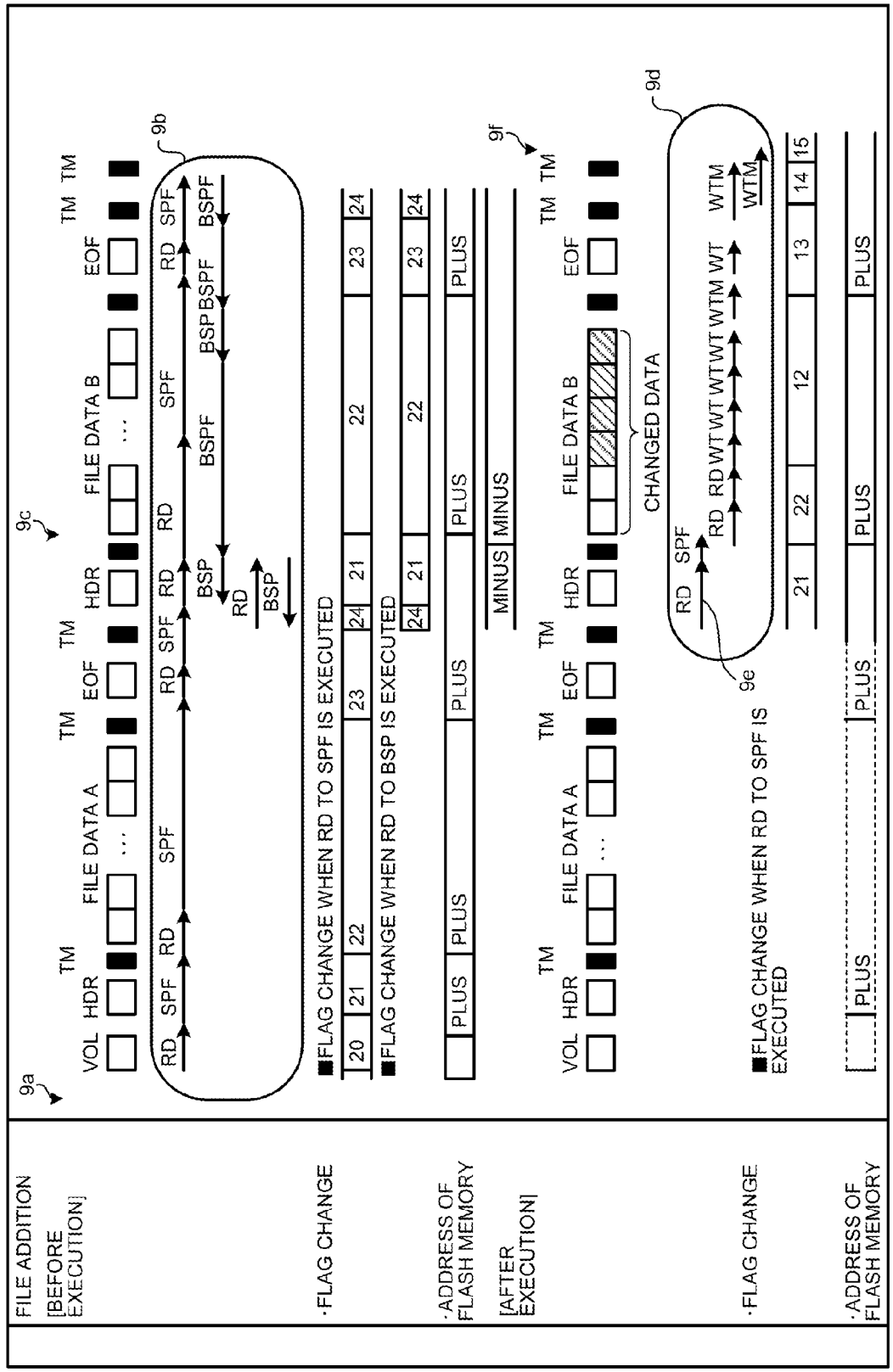
FIG. 9 is a diagram illustrating an example of a processing operation of file addition processing.
Figure 10:
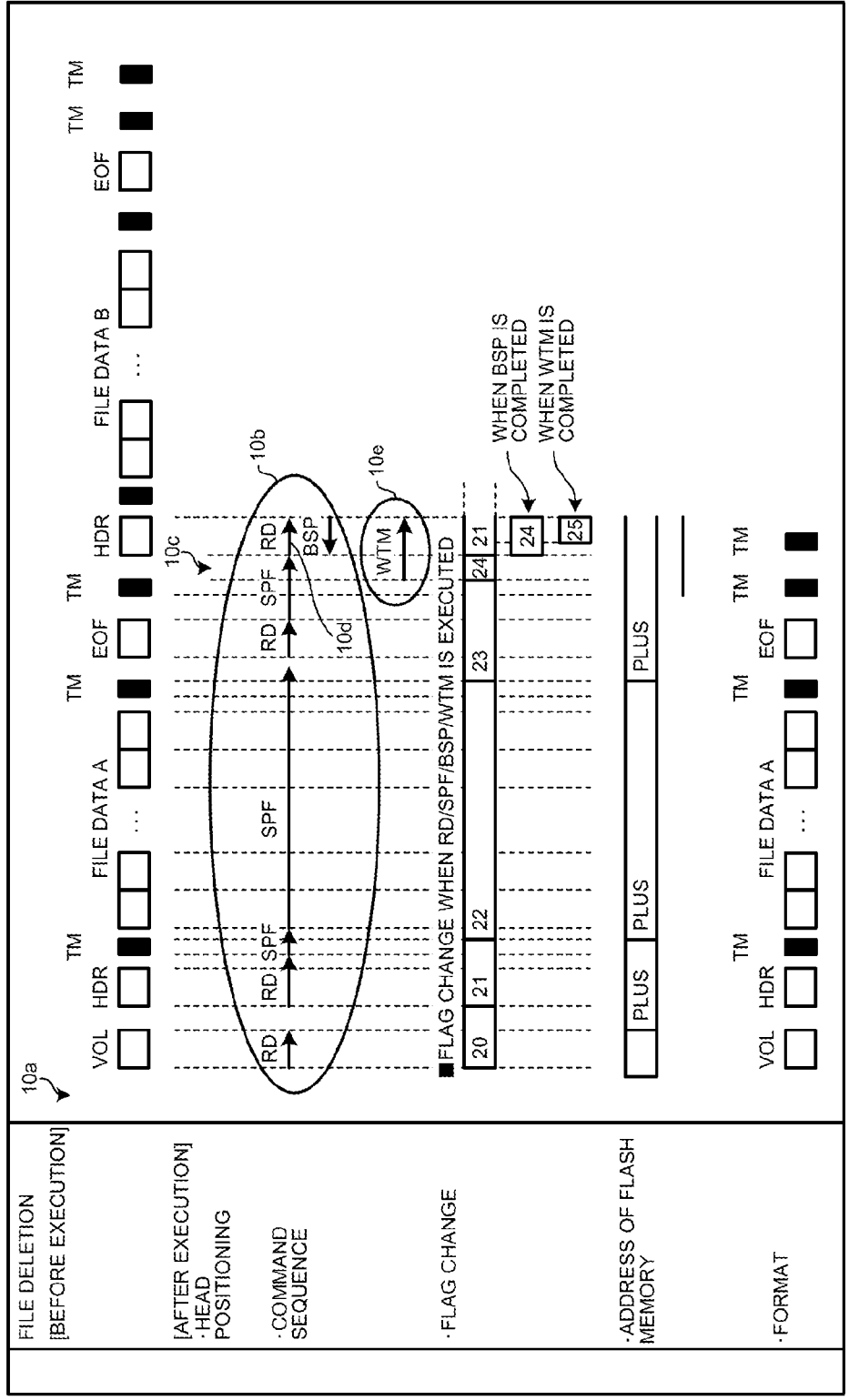
FIG. 10 is a diagram illustrating an example of a processing operation of file deletion processing.
Figure 11:
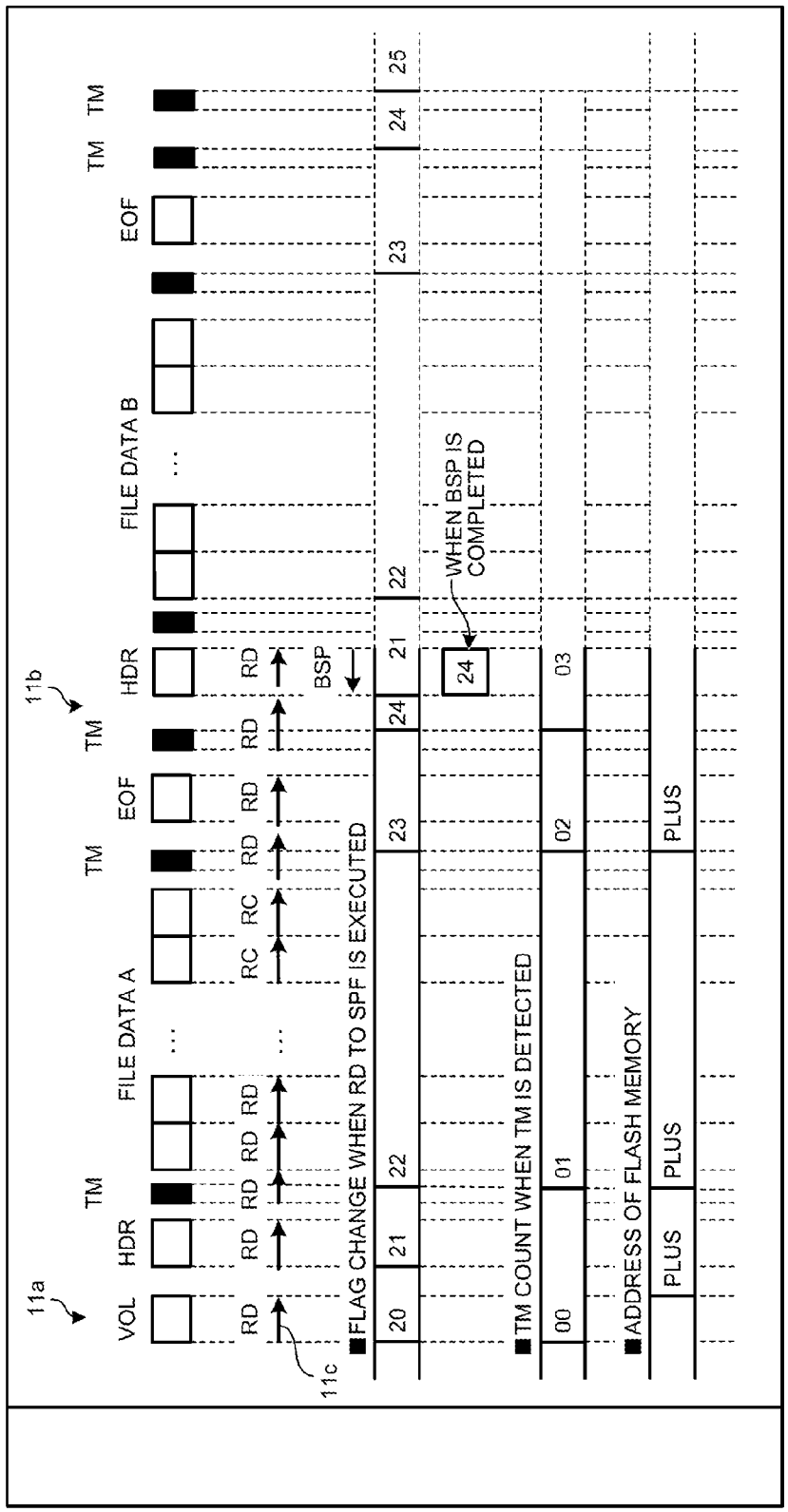
FIG. 11 is a diagram illustrating an example of a processing operation of head positioning processing.
Figure 12:
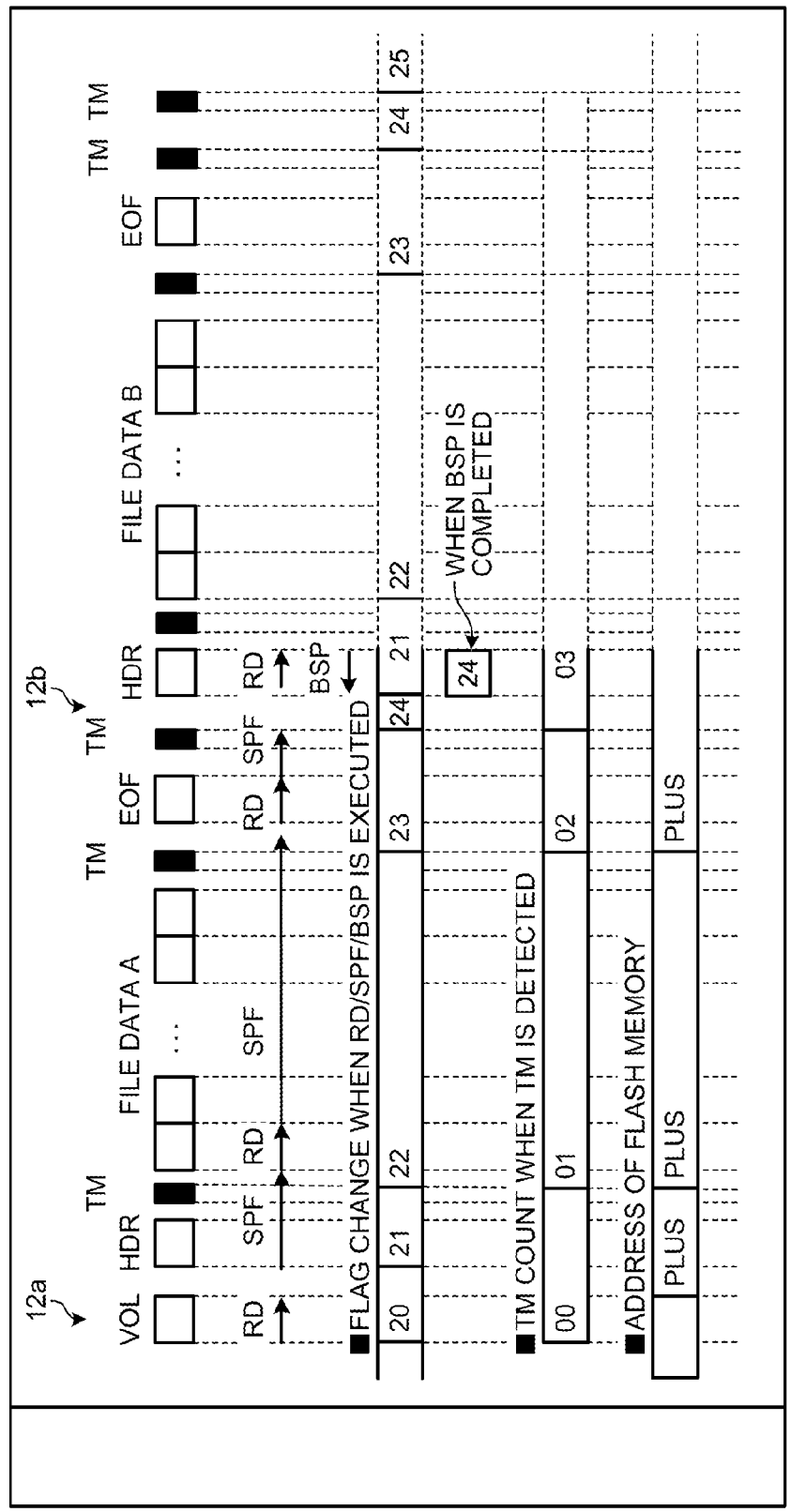
FIG. 12 is a diagram illustrating an example of a processing operation of head positioning processing.
Figure 13:
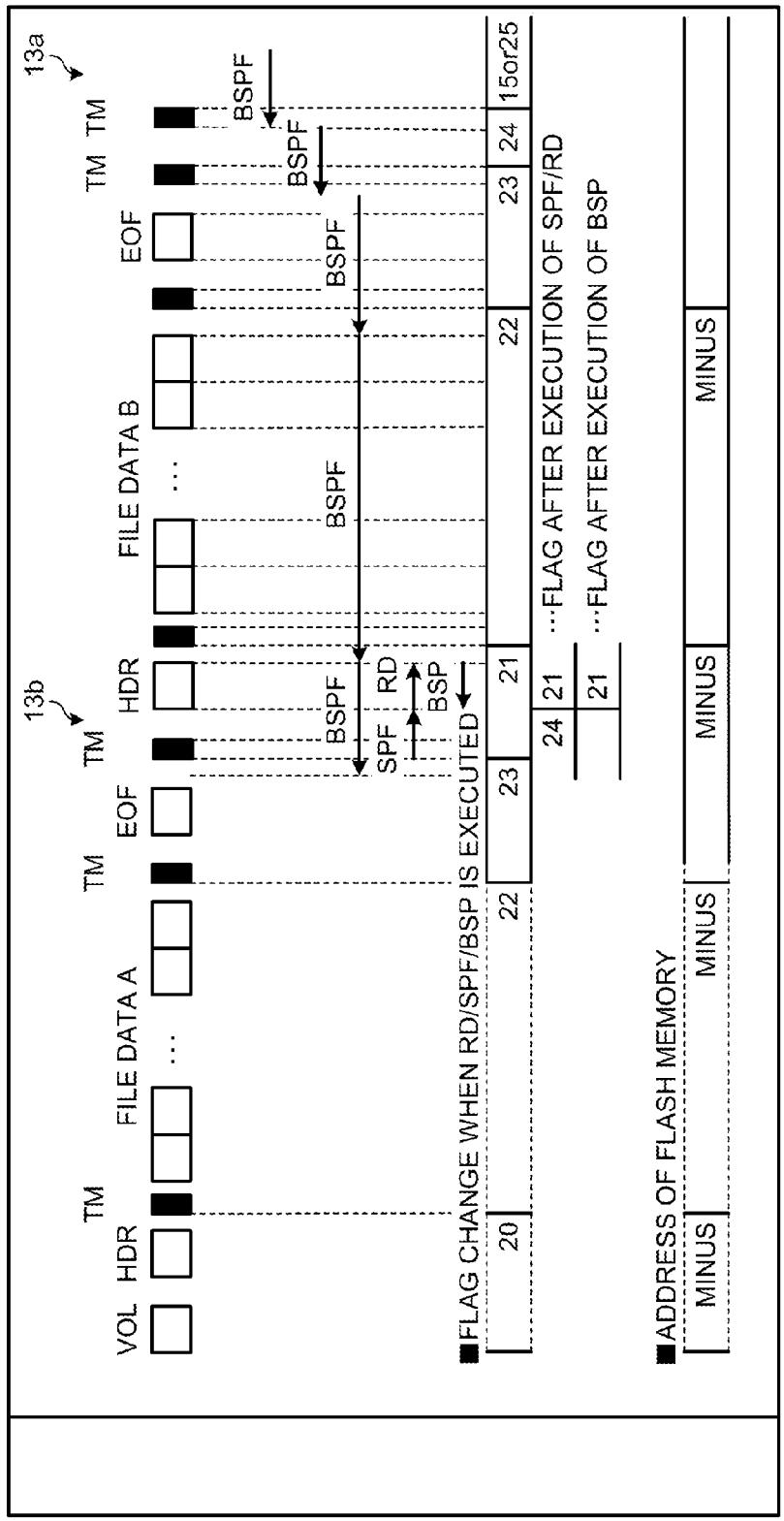
FIG. 13 is a diagram illustrating an example of a processing operation of head positioning processing.

Next, the processing operation performed by the tape device 100 according to the first embodiment is described using FIG. 13. FIG. 6 illustrates a processing operation of initialization processing, FIGS. 7 through 9 illustrate processing operations of file addition processing, and FIG. 10 illustrates a processing operation of file deletion processing. FIGS. 11 through 13 illustrate processing operations of head positioning processing.

Initialization

FIG. 6 is a diagram illustrating an example of a processing operation of the initialization processing. The initialization processing described herein is processing of writing a VOL in a cartridge medium when an unused cartridge medium is mounted to the drive 121.

As illustrated in FIG. 6, a head position 6a is located at the beginning of the cartridge medium before executing the processing. The tape device 100 reads the byte count from the WT command when the WT command transmitted from the host is detected. Here, when the byte count is 80 bytes, the tape device 100 extracts writing data from the data buffer 134, checks the VOL name of the writing data, and sets the status flag to 10. Subsequently, the tape device 100 executes the WT command to write a VOL in the cartridge medium.

Subsequently, the tape device 100 writes a VOL name in the management information table 133a during the idling routine executed after the end of the processing of the WT command. For example, the tape device 100 determines whether there is a VOL name which is the same as the VOL name to be written into the management information table 133a in the idling routine executed after the end of the processing of the WT command. For example, when the same VOL name does not exist, the tape device 100 determines a y-column address of the management information table 133a, and records a new VOL name in the management information table 133a. The tape device 100 increments an address position in the management information table 133a. A head position 6b, after the execution of the initialization processing, is located behind the VOL.

File Addition

FIG. 7 is a diagram illustrating an example of a processing operation of the file addition processing. Here, the description is made in connection with a case where file data A is added after the VOL is written. As illustrated in FIG. 7, a head position 7a before execution of the processing is located behind the VOL.

Before executing the writing of file data, the tape device 100 executes a command sequence 7b "RWD, RD". That is, the tape device 100 rewinds the cartridge medium to read the VOL and changes the status flag to 20. The tape device 100 increments an address position in the management information table 133a.

Subsequently, the tape device 100 processes along the procedure described below when additionally writing a file so as to start from the head position 7a illustrated in FIG. 7. The tape device 100 executes a command sequence 7c "WT, WTM, WT, WT, ..., WT, WT, WTM, WT, WTM, WTM" so that "HDR, TM, file data, TM, EOF, TM, TM" will be written. A specific example of the processing of the command sequence 7c is described below.

First, when the WT command is received, since the writing to be executed after the VOL is writing for a head area, the tape device 100 stores an HDR name in the management information table 133a. Subsequently, after the WTM command is executed, the tape device 100 changes the status flag from 11 to 12, increments the x-column address of the management information table 133a, and positions the result as the address of the processing byte count of the file data.

Then, since the writing to be executed after the next WT command is writing for file data A, the tape device 100 adds the processing byte count.

Since the writing of the file data is completed after the WTM command behind the file data A is executed, the tape device 100 stores the processing byte count in the management information table 133a, increments the x-column address, and positions the result as the address of a next HDR name.

The tape device 100 changes the status flag to 13 during the writing processing of the EOF data, and changes the status flag to 14 during the execution of the next WTM command. Subsequently, the tape device 100 obtains the non-recorded capacity at the current head position along the procedure described below, and records it in the management information table 133a. For example, the tape device 100 reads the recorded physical position which represents the recorded tape length from the CM 121b, and calculates the recorded capacity per unit length of a recorded portion of the tape. Subsequently, the tape device 100 calculates the non-recorded capacity from a non-recorded physical area and the recorded capacity.

The tape device 100 changes the status flag to 15 during the execution of the latter WTM command among two continuous WTM commands. A head position 7d is located behind the TM after the file addition processing is executed.

File Addition

FIG. 8 is a diagram illustrating an example of a processing operation of the file addition processing. Here, let's take as an example the case where file data B is added to the file format, in which file data A exists before the file addition processing is executed, especially to a head position 8a in the same drawing. The head position 8a is located ahead of the VOL.

First, before the tape device 100 executes the writing of the file data B, the tape device 100 executes a command sequence 8b "RD, SPF, RD, SPF, RD, SPF, RD, BSP", and positions a head position 8c between a TM and another TM. A specific example of the processing of the command sequence 8b is described below.

First, the tape device 100 acquires the transmission byte count from the drive unit 120 when a RD command 8d is received. Here, the tape device 100 determines that the read data of the data buffer 134 is the VOL from the fact that the byte count is 80 bytes. The tape device 100 determines whether the same VOL name as the VOL of the read data exists in the management information table 133a. When the same VOL name does not exist, the tape device 100 records a new VOL name in the management information table 133a.

When the tape device 100 reads the data under the SPF command, the read data is the HDR. Accordingly, the tape device 100 checks whether the byte count is 80 bytes and stores the HDR name of the data buffer 134 in the management information table 133a.

When the tape device 100 reads the TM being present behind the HRD under the SPF command, the tape device 100 increments the x-column address of the management information table 133a and uses it as the address to store the processing byte count. The tape device 100 sets the status flag to 22 which represents a status of reading the file data.

When the SPF command is issued with respect to the file data A, in order to read a data block, the tape device 100 adds the processing byte count up to the TM being read. When the TM is read, the tape device 100 stores the processing byte count in the management information table 133a, increments the x-column address, and positions the result as the address of the next HDR name. The tape device 100 changes the status flag to 23.

When the tape device 100 reads the TM behind the EOF under the SPF command, it changes the status flag to 24, obtains non-recorded capacity at the current head position according to the procedure described below, and records it in the management information table 133a. For example, the tape device 100 calculates the sum of the data volumes up to the address in the current management information table 133a, adds a difference with the total recorded capacity in the table to the non-recorded capacity (non-recorded capacity after file deletion), and calculates the non-recorded capacity at the current head position.

The tape device 100 changes the status flag to 25 and 24 when it reads the second TM behind the EOF under the RD and BSP commands.

The tape device 100 executes the writing of the file data B by the processing described below according to a command sequence 8e. When the first WT command is received, the tape device 100 determines whether the byte count is 80 and performs writing the HDR behind the EOF. The tape device 100 changes the status flag to 11. Since subsequent command processing is the processing which is the same as the file addition processing of the command sequence 7c illustrated in FIG. 7, the description thereof is not repeated. A head position 8f is located behind the TM after the file addition processing is executed.

File Addition

FIG. 9 is a diagram illustrating an example of a processing operation of the file addition processing. Here, let's take an example the case where, with regard to the format in which the file data A and the file data B exist before the execution, an update is made such that a first block and a second block of the file data B remain and four blocks are newly added starting from a head position 9a of the same drawing. The head position 9a before the execution of the processing is located ahead of the VOL.

The tape device 100 is positioned in an HDR leading block of the file data B according to a command sequence 9b. For example, a tape device 24 calculates the sum of the data volume up to the address in the current management information table 133a, adds a difference with the total recorded capacity in the table to the non-recorded capacity, and calculates the non-recorded capacity at the current head position. A head position 9c is located behind the TM after the command sequence 9b is executed.

The tape device 100 executes writing of changed data of the file data B by the following processing according to a command sequence 9d transmitted from the host which is a command sequence for updating the file data B. When a RD command 9e is executed, the tape device 100 will store the HDR name in the management information table 133a because of the status flag is 24 which represents the position directly ahead of the HDR behind the EOF.

The tape device 100 increments the x-column address of the management information table 133a under a following SPF command and uses it as the address to store the processing byte count. The status flag is changed from 21 to 22. The tape device 100 reads 2 blocks from the head of the file data B, and adds the processing byte count.

The tape device 100 executes writing of new data by writing four blocks from the third block from the head of the file data B, changes the status flag to 12, and continuously adds the processing byte count of this processing to the processing byte count of the RD command. Since processing subsequent to the WTM command behind the file data B is the same as the file addition processing executed according to the command sequence 7c illustrated in FIG. 7, the description thereof is not repeated. A head position 8f is located behind the TM after the file addition processing is executed.

File Deletion

FIG. 10 is a diagram illustrating an example of a processing operation of the file deletion processing. Here, let's take as an example the case where the file data B is deleted from the file format, in which the file data A and the file data B exist before the execution of the file deletion processing, especially from the head position 8a of the same drawing. A head position 10a is located ahead of the VOL.

The tape device 100 positions a head position 10c at the beginning of the HDR of the file data B according to a command sequence 10b. The tape device 100 changes the status flag to 21 when an RD command 10d of the HDR of the file data B is executed, and changes the status flag to 24 which represents the state where the head position is located directly ahead of the HDR which is present behind the EOF when the BSP command is executed.

When the status flag becomes 24, the tape device 100 calculates the sum of the data volumes up to the address in the current management information table 133a, adds a difference with the total recorded capacity of the table to the non-recorded capacity (non-recorded capacity after the file deletion), and calculates the non-recorded capacity at the current head position.

The tape device 100 executes the WTM command of a command sequence 10e, newly adds one TM at a position behind the EOF of the file data A, and deletes the file. The processing is performed in the following way.

The tape device 100 changes the status flag to 25 which represents the end of the file data at the time of executing the WTM command, reads the recorded physical position which represents the recorded tape length from the CM 121b, and computes a recorded capacity per unit recorded tape length from the recorded physical position and the total recorded capacity. Subsequently, the tape device 100 calculates the non-recorded capacity from the non-recorded physical area and the recorded capacity. The tape device 100 records the total recorded capacity and the non-recorded capacity in the management information table 133a. Since it comes to the end of the file data, the tape device 100 executes the deletion processing of the data volume and the HDR of the table of the management information table 133a.

Positioning of Head

FIG. 11 is a diagram illustrating an example of a processing operation of head positioning processing. Herein, with regard to the file format in which the file data A and the file data B exist before the execution of this processing, when a head position is changed from a head position 11a illustrated in the same drawing to a head position 11b located at the HDR of the file data B, the processing according to a general execution example of a command transmitted from the host is illustrated. Here, illustrated is an example in which all RD commands are performed until the HDR of the file data B can be read and the BSP command is executed when the HDR of the file data B has been read.

When the byte count of an RD command 11c is 80 bytes and when the data of the data buffer 134 is the VOL, the tape device 100 sets the status flag to 20, determines whether a VOL name which is the same as the corresponding VOL name exists in the management information table 133a, and determines the y-column address of the management information table 133a. The tape device 100 records a new VOL name in the management information table 133a when the same VOL name as the corresponding VOL name does not exist.

Since an RD command appearing after reading the VOL is a command of reading an HDR name, the tape device 100 sets the status flag to 21 after confirming that the byte count is 80 bytes, and stores the HDR name in the management information table 133a.

The tape device 100 increments the x-column address in the management information table 133a to store the processing byte count of the file data A when the TM behind the HDR is read. The tape device 100 adds the processing byte count after executing the RD command with respect to the file data A.

When the TM behind the file data is detected under the RD command, the tape device 100 stores the processing byte count in the management information table 133a, increments the address of the management information table 133a, and positions the result as the address of the following HDR name. The tape device 100 detects the TM behind the EOF under the RD command, and changes the status flag to 24 which represents the position directly ahead of the HRD which is present behind the EOF. The tape device 100 does not increment or decrement the x-column address.

When the status flag is changed to 24, the tape device 100 calculates the sum of the data volumes up to the address in the current management information table 133a, adds a difference with the total recorded capacity of the table to the non-recorded capacity (non-recorded capacity after the file deletion), and calculates the non-recorded capacity at the current head position.

Since the next RD command is a command of reading an HDR, the tape device 100 sets the status flag to 21 after confirming that the byte count is 80 bytes, and stores the HDR name in the management information table 133a. The tape device 100 does not increment or decrement the address of the management information table 133a since the BSP command is only back-read processing.

Positioning of Head

FIG. 12 is a diagram illustrating an example of a processing operation of the head positioning processing. Herein, like the case of FIG. 11, with regard to the file format in which the file data A and the file data B exist before the execution of this processing, when a head position is changed from a head position 12a illustrated in the same drawing to a head position 12b which is located at the HDR of the file data B, the processing according to a general execution example of a command transmitted from the host is illustrated. The transmitted commands other than a command of executing the SPF command with respect to the TM are performed by the same processing illustrated in FIG. 11. Hereinafter, the processing at the time of executing the SPF command is described below.

The tape device 100 executes the processing described below when executing the SPF command with respect to the TM behind the HDR. After reading the HDR, the tape device 100 reads the TM, increments the address of the management information table 133a, and positions the result as the address to store the processing byte count.

The tape device 100 executes the processing described below when executing the SPF command with respect to the TM behind the file data. The tape device 100 stores the processing byte count in the management information table 133a, increments the address of the management information table 133a, and positions the result as the address of the next HDR name.

The tape device 100 executes the processing described below when executing the SPF command with respect to the TM behind the EOF. The tape device 100 changes the status flag to 24 which represents the TM behind the EOF. In addition, the tape device 100 does not increment or decrement the address of the management information table 133a.

The tape device 100 calculates the non-recorded capacity at the current head position in the same way described in FIG. 11. Under the RD command with respect to the HDR of the file data B, the tape device 100 stores an HDR name in the management information table 133a.

Under the BSP command with respect to the HDR of the file data B, the tape device 100 changes the status flag to 24 which represents the TM behind the EOF.

Positioning of Head

FIG. 13 is a diagram illustrating an example of a processing operation of the head positioning processing. Here, when a head position is changed from a position which is behind two TMs behind the file data B to a head position 13a which is an HDR of the preceding file data B, processing according to a general example of a command issued by the host is described. It is assumed that reading or writing at the current head position 13a is completed.

The tape device 100 reads the TM ahead of the EOF when the execution of the BSPF command is started from the latter one of two continuous TMs. Here, the tape device 100 decrements the address in the management information table 133a when it comes to the file data B, and positions the result as the address to store the processing byte count.

The tape device 100 performs the processing described below when executing the BSPF command with respect to the TM ahead of the file data. The tape device 100 decrements the address in the management information table 133a, and uses it as the address of the HDR name. The tape device 100 changes the status flag to 21 which represents an HDR area.

The tape device 100 executes the processing described below when executing the BSPF command with respect to the TM ahead of the HDR. The tape device 100 does not change the address in the management information table 133a. The tape device 100 changes the status flag to 23 which represents an EOF area.

The tape device 100 executes the processing described below when executing the SPF command with respect to the TM behind the EOF. The tape device 100 changes the status flag to 24 which represents the TM behind the EOF. The tape device 100 does not change the address in the management information table 133a. Subsequently, the tape device 100 calculates the non-recorded capacity at the current head position in the same way described in FIG. 11.

In the tape device 100, the processing of the RD command of the HDR block and the processing of the BSP command are performed in the same way illustrated in FIG. 11.

Processing Procedure Performed by Tape Device According to First Embodiment

Next, the processing procedure performed by the tape device 100 according to the first embodiment is described using FIGS. 14 through 21. Here, the procedure of the WT command processing is described using FIG. 14, and the procedure of the RD command processing is described using FIG. 15. The procedure of the idling processing is described using FIG. 16, the procedure of the SPF/SP command processing is described using FIG. 17, and the procedure of the BSPF/BSP command processing is described using FIG. 18. The procedure of the WTM command processing is described using FIG. 19, the procedure of the RWD command processing is described using FIG. 20, and the procedure of the SDIAG command processing is described using FIG. 21.

WT Command Processing

Figure 14:
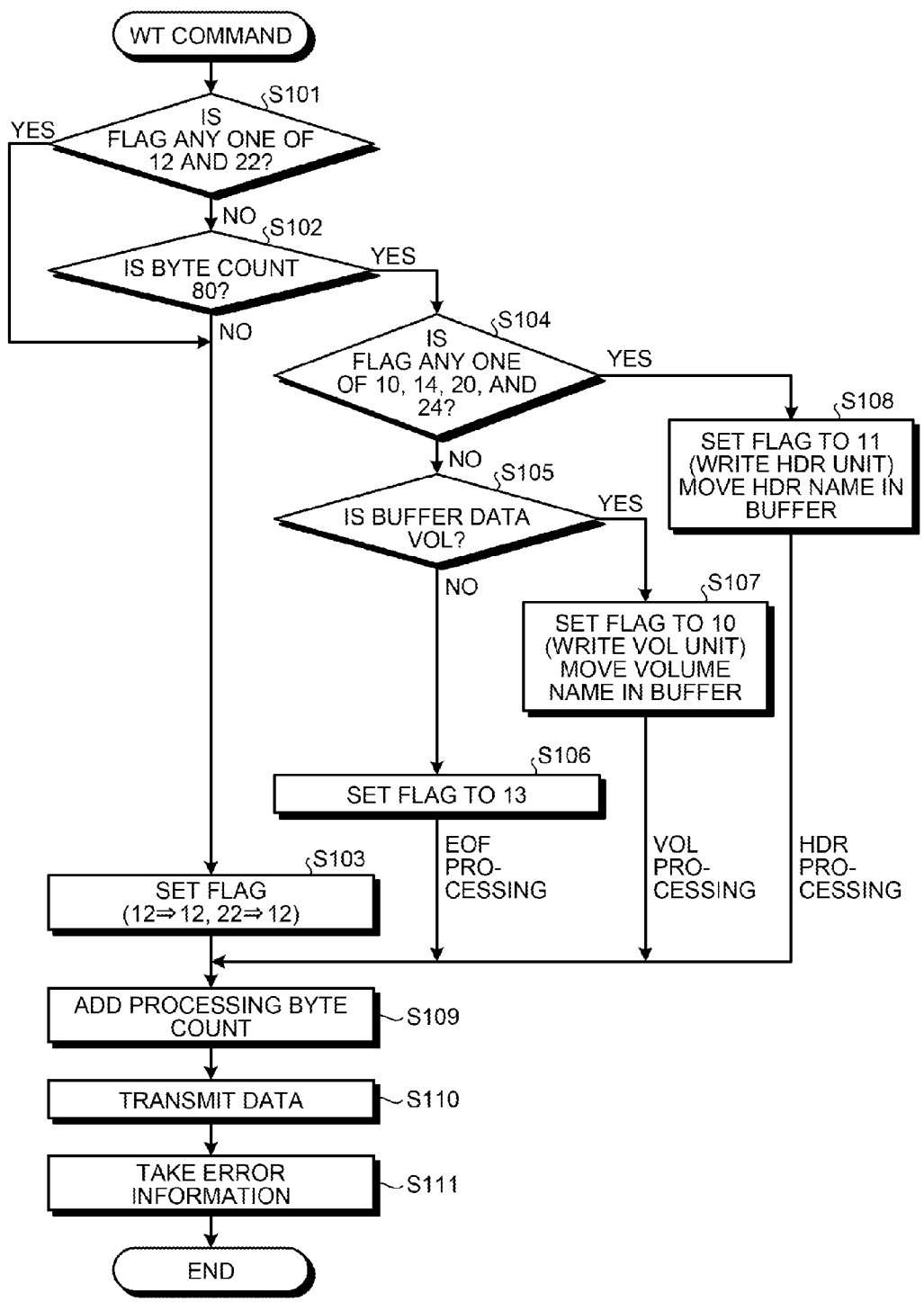
FIG. 14 is a flowchart illustrating the procedure of WT command processing performed by the tape device according to the first embodiment.

FIG. 14 is a flowchart illustrating the procedure of the WT command processing performed by the tape device according to the first embodiment. As illustrated in FIG. 14, the tape device 100 determines whether the status flag is any one of 12 and 22 when the WT command is received (Step S101). That is, the tape device 100 determines whether it is in the writing state of the file data or the reading state of the file data.

When it is determined that the status flag is neither 12 nor 22 (No in Step S101), the tape device 100 determines whether the byte count is 80 (Step S102). That is, the tape device 100 determines whether it is in the writing state or the reading state of the VOL, the HDR, and the EOF.

Here, when it is determined that the status flag is any one of 12 and 22 (Yes in Step S101), or when it is determined that the byte count is not 80 (No in Step S102), the tape device 100 sets the status flag to 12 (Step S103).

When it is determined that the byte count is 80 (Yes in Step S102), the tape device 100 determines whether or not the status flag is any one of 10, 14, 20, and 24 (Step S104). When it is determined that the status flag is none of 10, 14, 20, and 24 (No in Step S104), the tape device 100 determines whether the data is the VOL (Step S105).

When it is determined that the data of the data buffer 134 is not the VOL (No in Step S105), the tape device 100 sets the status flag to 13 (Step S106). On the other hand, when it is determined that the data of the data buffer 134 is the VOL (Yes in Step S105), the tape device 100 sets the status flags to 10 and moves the VOL name in the data buffer 134 to the memory 135 (Step S107).

On the other hand, when it is determined that the status flag is any one of 10, 14, 20, and 24 (Yes in Step S104), the tape device 100 sets the status flags to 11 and moves the HDR name in the data buffer 134 to the memory 135 (Step S108).

Subsequently, the tape device 100 adds up the processing byte count (Step S109). Subsequently, the tape device 100 executes the writing processing. For example, the tape device 100 transmits data to the data buffer 122 from the data buffer 134 (Step S110). Subsequently, the tape device 100 takes error information from the drive unit 120 (Step S111). The tape device 100 ends the WT command processing after the completion of Step S111.

RD Command Processing

Figure 15:
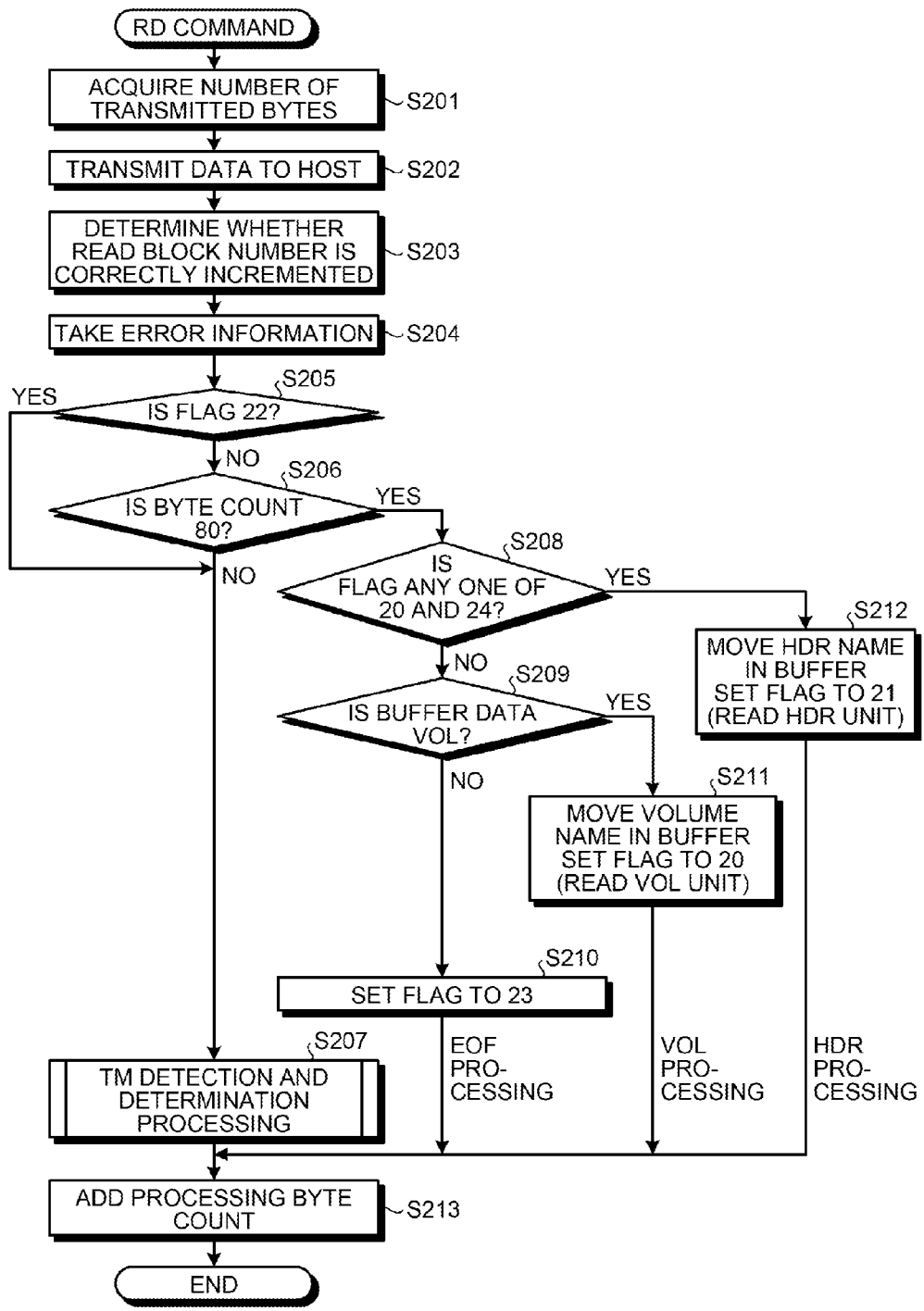
FIG. 15 is a flowchart illustrating the procedure of RD command processing performed by the tape device according to the first embodiment.

FIG. 15 is a flowchart illustrating the procedure of the RD command processing performed by the tape device according to the first embodiment. As illustrated in FIG. 15, the tape device 100 acquires the number of transmitted bytes from the drive unit 120 when the RD command is received (Step S201). For example, the tape device 100 transmits data to the host from the data buffer 134 (Step S202). Subsequently, the tape device 100 determines whether the increment of a read block number is carried out correctly (Step S203). At the time of writing data, the read block number is written by adding a number to a block with use of hardware. Subsequently, the tape device 100 takes error information from the drive unit 120 (Step S204).

Subsequently, the tape device 100 determines whether the status flag is 22 (Step S205). That is, the tape device 100 determines whether it is in the reading state of the file data. Here, when it is determined that the status flag is not 22 (No in Step S205), the tape device 100 determines whether the byte count is 80 (Step S206).

When it is determined that the status flag is 22 (Yes in Step S205), or when it is determined that the byte count is not 80 (No in Step S206), the tape device 100 executes determination processing of TM detection (Step S207). The details of the determination processing of TM detection are described below.

When it is determined that the byte count is 80 (Yes in Step S206), the tape device 100 determines whether or not the status flag is any one of 20 and 24 (Step S208). When it is determined that the status flag is neither 20 nor 24 (No in Step S208), the tape device 100 determines whether the data is the VOL (Step S209).

When it is determined that the data of the data buffer 134 is not the VOL (No in Step S209), the tape device 100 sets the status flag to 23 (Step S210). On the other hand, when it is determined that the data of the data buffer 134 is the VOL (Yes in Step S209), the tape device 100 sets the status flag to 20 and moves the VOL name in the data buffer 134 to the memory 135 (Step S211).

When it is determined that the status flag is any one of 20 and 24 (Yes in Step S208), the tape device 100 sets the status flag to 21 and moves the HDR name in the data buffer 134 to the memory 135 (Step S212).

Subsequently, the tape device 100 adds up the processing byte count (Step S213), and ends the RD command processing.

Idling Processing

Figure 16:
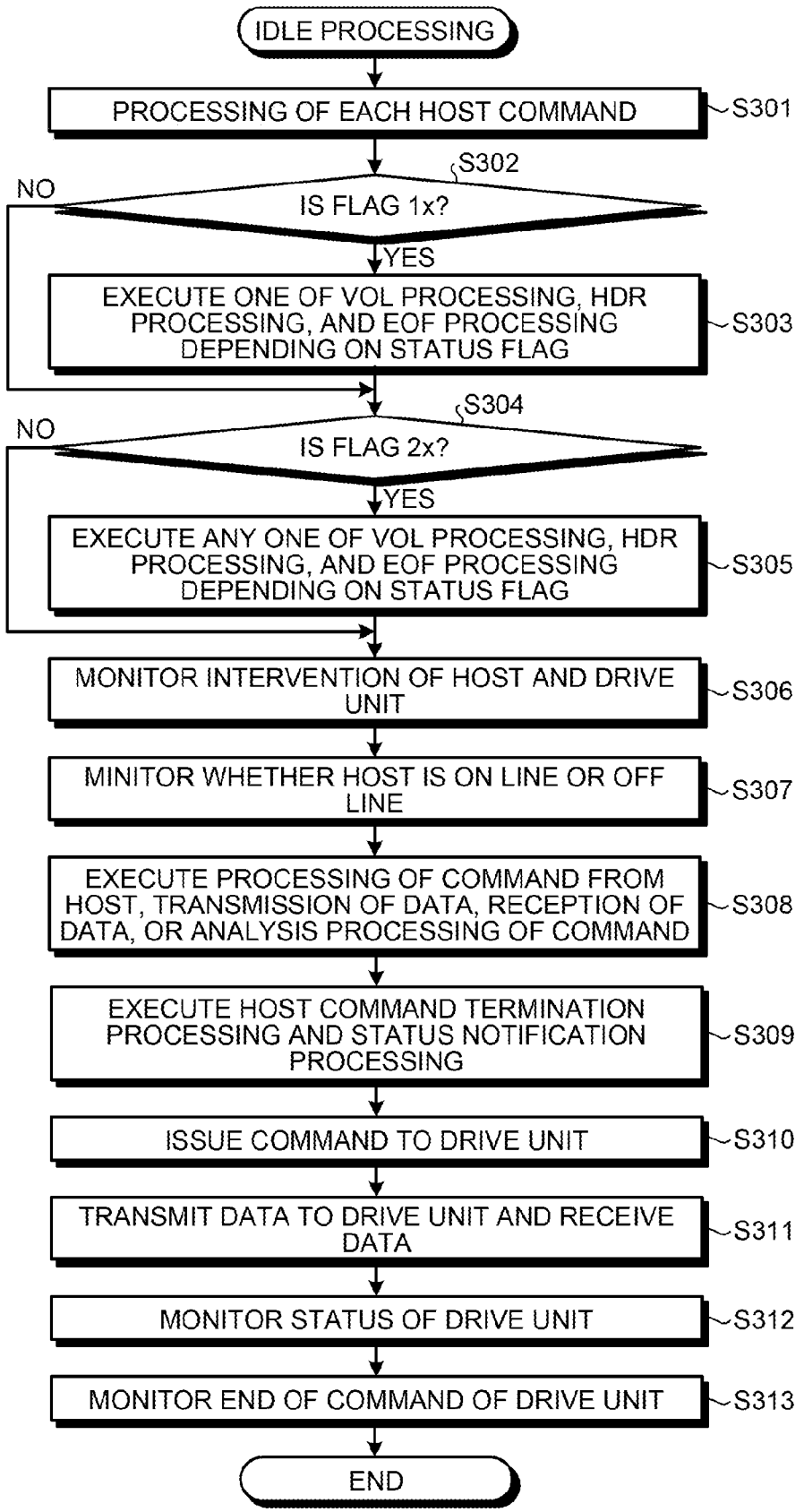
FIG. 16 is a flowchart illustrating the procedure of idling processing performed by the tape device according to the first embodiment.

FIG. 16 is a flowchart illustrating the procedure of the idle processing performed by the tape device according to the first embodiment. As illustrated in FIG. 16, the tape device 100 processes each command from the host (Step S301). Subsequently, the tape device 100 determines whether the status flag is any one of 10 through 15 (Step S302).

When it is determined that the status flag is any one of 10 through 15 (Yes in Step S302), the tape device 100 executes one of VOL processing, HRD processing, and EOF processing depending on the status flag (Step S303). For example, the tape device 100 determines a y-column of the moved VOL name as the VOL processing, stores the VOL name in the management information table 133a, and increments the address. The tape device 100 stores an HDR name in the management information table 133a as the HDR processing.

When it is determined that the status flag is none of 10 through 15 (No in Step S302), or at timing after the end of Step S303, the tape device 100 determines whether the status flag is any one of 20 through 25 (Step S304).

When it is determined that the status flag is any one of 20 through 25 (Yes in Step S304), the tape device 100 executes any one of the VOL processing, the HRD processing, and the EOF processing depending on the status flag (Step S305) like Step S303.

When it is determined that the status flag is none of 20 through 25 (No in Step S304), or at timing after the end of Step S305, the tape device 100 executes the processing described below. That is, the tape device 100 monitors intervention by the drive unit 120 and the host (Step S306), and monitors whether the host is on line or off line (Step S307).

In addition, the tape device 100 executes processing of a command from the host, transmission of data, reception of data, or processing of analyzing the command (Step S308).

Subsequently, the tape device 100 executes host command termination processing and status notification processing (Step S309).

The tape device 100 issues a command code to the drive unit 120 (Step S310), and transmits and receives data to and from the drive unit 120 (Step S311). Subsequently, the tape device 100 monitors the status of the drive unit 120 (Step S312), and monitors the end of the command of the drive unit 120 (Step S313). The tape device 100 ends the idling processing after the completion of Step S313.

SPF/SP Command Processing

Figure 17:
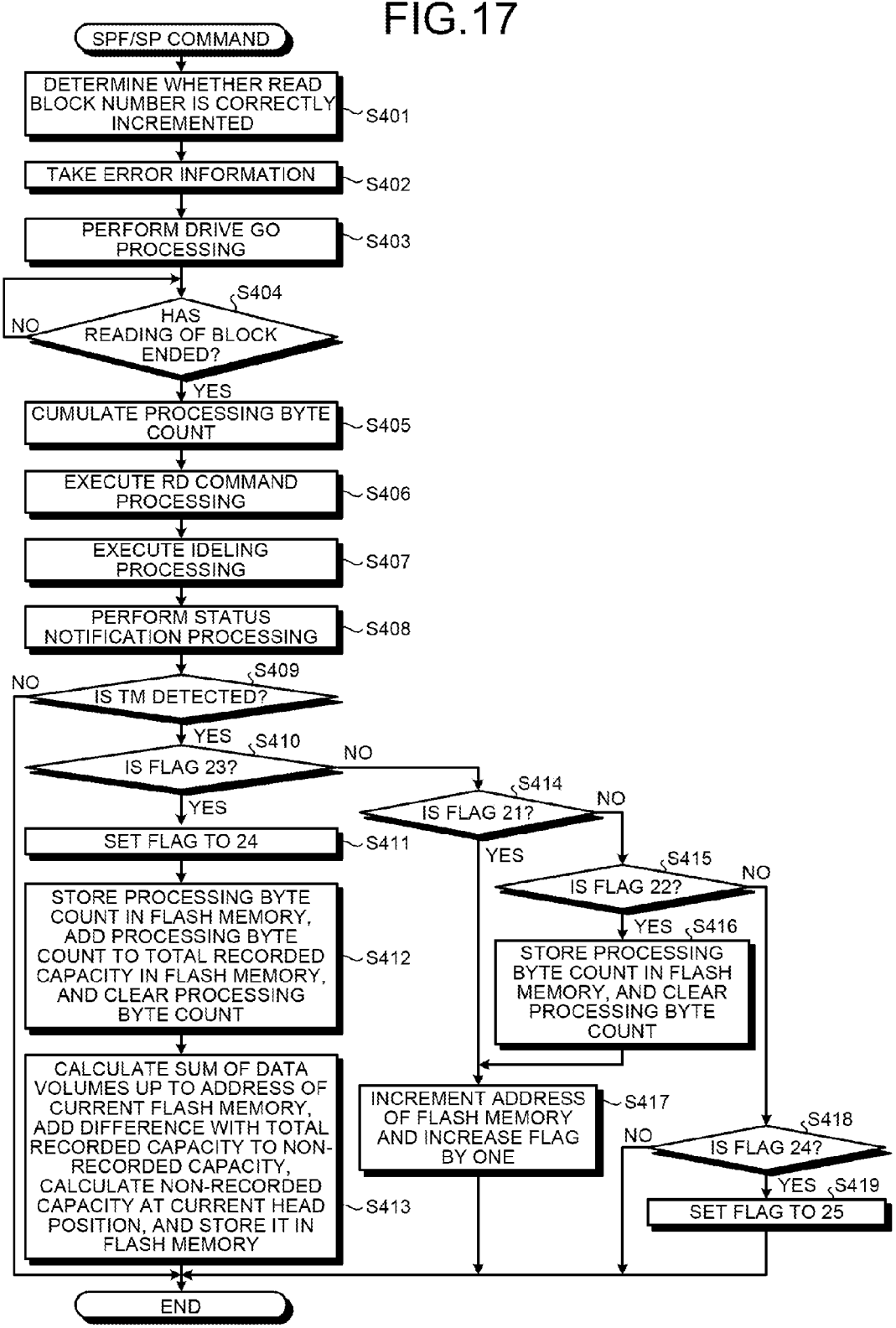
FIG. 17 is a flowchart illustrating the procedure of SPF/SP command processing performed by the tape device according to the first embodiment.

FIG. 17 is a flowchart illustrating the procedure of the SPF/SP command processing performed by the tape device according to the first embodiment. As illustrated in FIG. 17, the tape device 100 determines whether a block number which is read is correctly incremented (Step S401). Subsequently, the tape device 100 takes SPF/SP error information from the drive unit 120 (Step S402). Subsequently, the tape device 100 executes drive GO processing (Step S403). In addition, the drive GO processing implies the activation of the drive unit 120.

The tape device 100 determines whether the reading of a block has ended (Step S404). Here, when it is determined that the reading of the block has not ended (No in Step S404), the tape device 100 repeats the determination processing until the reading is completed.

When it is determined that the reading of the block has ended (Yes in Step S404), the tape device 100 cumulates the processing byte count (Step S405). Subsequently, the tape device 100 executes the RD command processing (Step S406). For example, the tape device 100 executes Step S201 through Step S204 illustrated in FIG. 15. Subsequently, the tape device 100 executes the idling processing (Step S407). For example, the tape device 100 executes Step S306 through Step S313 illustrated in FIG. 16. Subsequently, the tape device 100 executes the status notification processing (Step S408).

Then, the tape device 100 performs TM detection determination processing of Step S409 through Step S419. In addition, this processing corresponds to the TM detection and determination processing of Step S207 of FIG. 15. For example, the tape device 100 determines whether the TM is detected (Step S409). Here, when it is determined that the TM is detected (Yes in Step S409), the tape device 100 determines whether the status flag is 23 (Step S410).

When it is determined that the status flag is 23 (Yes in Step S410), the tape device 100 sets the status flag to 24 (Step S411). Subsequently, the tape device 100 stores processing bytes, and a value obtained by adding the processing bytes to the total recorded capacity in the management information table 133a, and clears the processing byte count (Step S412).

The tape device 100 calculates the sum of the data volume up to the current address in the management information table 133a, adds a difference with the total recorded capacity to the non-recorded capacity to calculate the non-recorded capacity at the current head position, and records it in the management information table 133a (Step S413). The tape device 100 ends the SPF/SP command processing after the completion of Step S413.

Here, when it is determined that the status flag is not 23 (No in Step S410), the tape device 100 determines whether the status flag is 21 (Step S414). Here, when it is determined that the status flag is not 21 (No in Step S410), the tape device 100 determines whether the status flag is 22 (Step S415). Here, when it is determined that the status flag is 22 (Yes in Step S415), the tape device 100 records the processing byte count in the management information table 133*a* and clears the processing byte count (Step S416).

When it is determined that the status flag is 21 (Yes in Step S414), or at timing after the end of Step S416, the tape device 100 executes the processing described below. That is, the tape device 100 increments the address in the management information table 133*a*, changes the status flag to a status flag which is obtained by adding 1 to the current status flag (Step S417), and ends the SPF/SP command processing.

Here, when it is determined that the status flag is not 22 (No in Step S415), the tape device 100 determines whether the status flag is 24 (Step S418). That is, the tape device 100 determines whether two TMs are detected continuously. When it is determined that the status flag is 24 (Yes in Step S418), the tape device 100 sets the status flag to 25 (Step S419). The tape device 100 ends the SPF/SP command processing after the completion of Step S419.

When it is determined that the TMs are not detected (No in Step S409), or when it is determined that the status flag is not 24 (No in Step S418), the tape device 100 ends the SPF/SP command processing.

BSPF/BSP Command Processing

Figure 18:
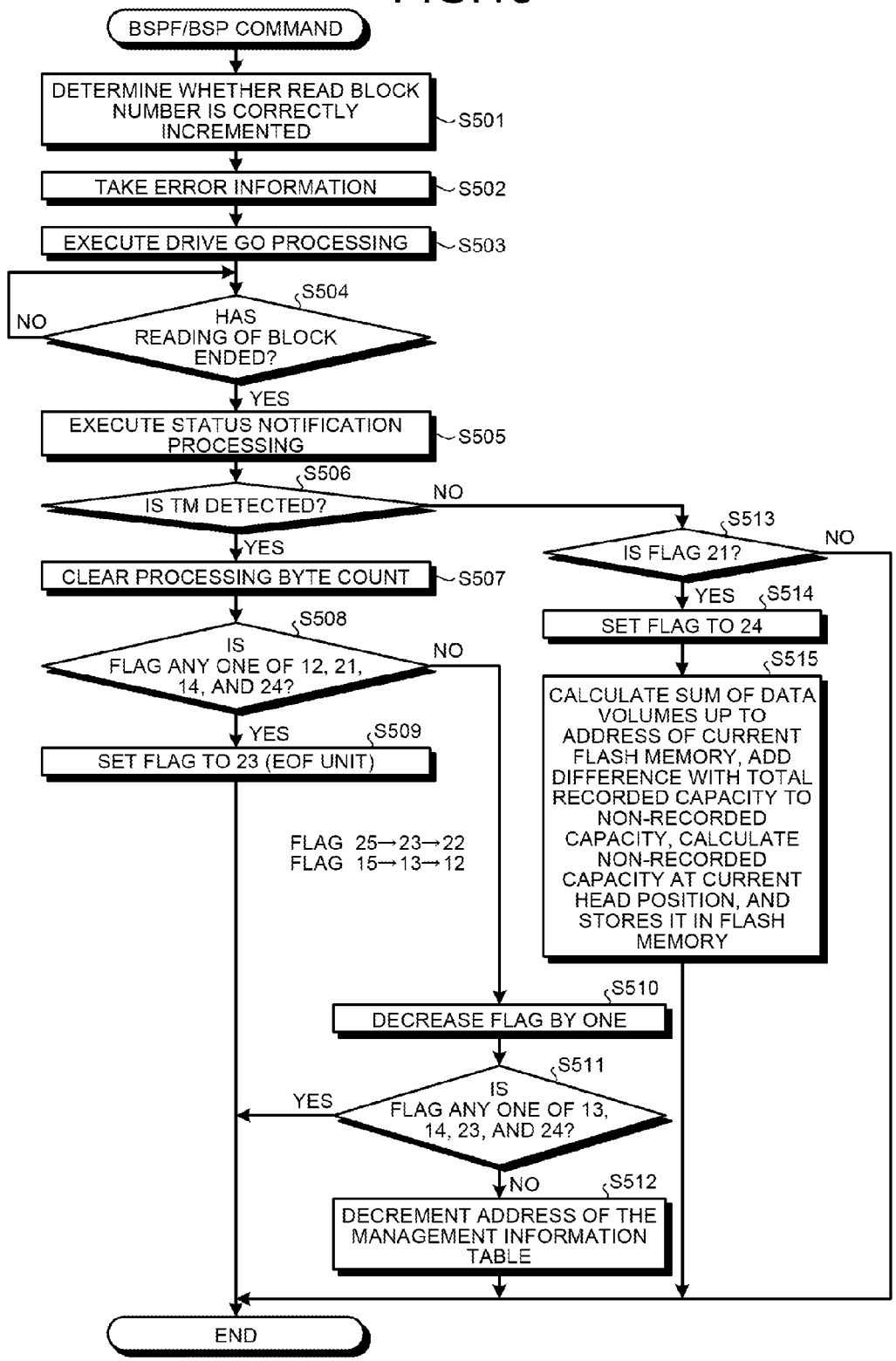
FIG. 18 is a flowchart illustrating the procedure of BSPF/BSP command processing performed by the tape device according to the first embodiment.

FIG. 18 is a flowchart illustrating the procedure of the BSPF/BSP command processing performed by the tape device according to the first embodiment. As illustrated in FIG. 18, the tape device 100 determines whether the read block number is correctly incremented (Step S501). Subsequently, the tape device 100 takes BSPF/BSP error information from the drive unit 120 (Step S502). Subsequently, the tape device 100 executes drive GO processing (Step S503).

The tape device 100 determines whether the reading of a block has ended (Step S504). Here, when it is determined that the reading of a block has not ended (No in Step S504), the tape device 100 repeats the determination processing until the reading is completed. When it is determined that the reading of a block has ended (Yes in Step S504), the tape device 100 executes status notification processing (Step S505).

For example, the tape device 100 determines whether the TM is detected (Step S506). When it is determined that the TM is detected (Yes in Step S506), the tape device 100 clears the processing byte count (Step S507).

Subsequently, the tape device 100 determines whether the status flag is any one of 11, 21, 14, and 24 (Step S508). When it is determined that the status flag is any one of 11, 21, 14, and 24 (Yes in Step S508), the tape device 100 sets the status flag to 23 (Step S509) and ends the BSPF/BSP command processing.

When it is determined that the status flag is none of 11, 21, 14, and 24 (No in Step S508), the tape device 100 changes the status flag to a status flag obtained by subtracting 1 from the current status flag (Step S510). Subsequently, the tape device 100 determines whether the status flag is any one of 13, 14, 23, and 24 (Step S511).

When it is determined that the status flag is any one of 13, 14, 23, and 24 (Yes in Step S511), the tape device 100 ends the BSPF/BSP command processing. When it is determined that the status flag is none of 13, 14, 23, and 24 (No in Step S511), the tape device 100 increments the address in the management information table 133*a* (Step S512), and ends the BSPF/BSP command processing.

Here, when it is determined that the TM is not detected (No in Step S506), the tape device 100 determines whether the status flag is 21 (Step S513). When it is determined that the status flag is not 21 (No in Step S513), the tape device 100 ends the BSPF/BSP command processing.

When it is determined that the status flag is 21 (Yes in Step S513), the tape device 100 sets the status flag to 24 (Step S514). Subsequently, the tape device 100 calculates the sum of the data volumes up to the current address in the management information table 133*a*, adds a difference with the total recorded capacity to the non-recorded capacity to calculate the non-recorded capacity at the current head position, and records it in the management information table 133*a* (Step S515). The tape device 100 ends the BSPF/BSP command processing after the completion of Step S515.

WTM Command Processing

Figure 19:
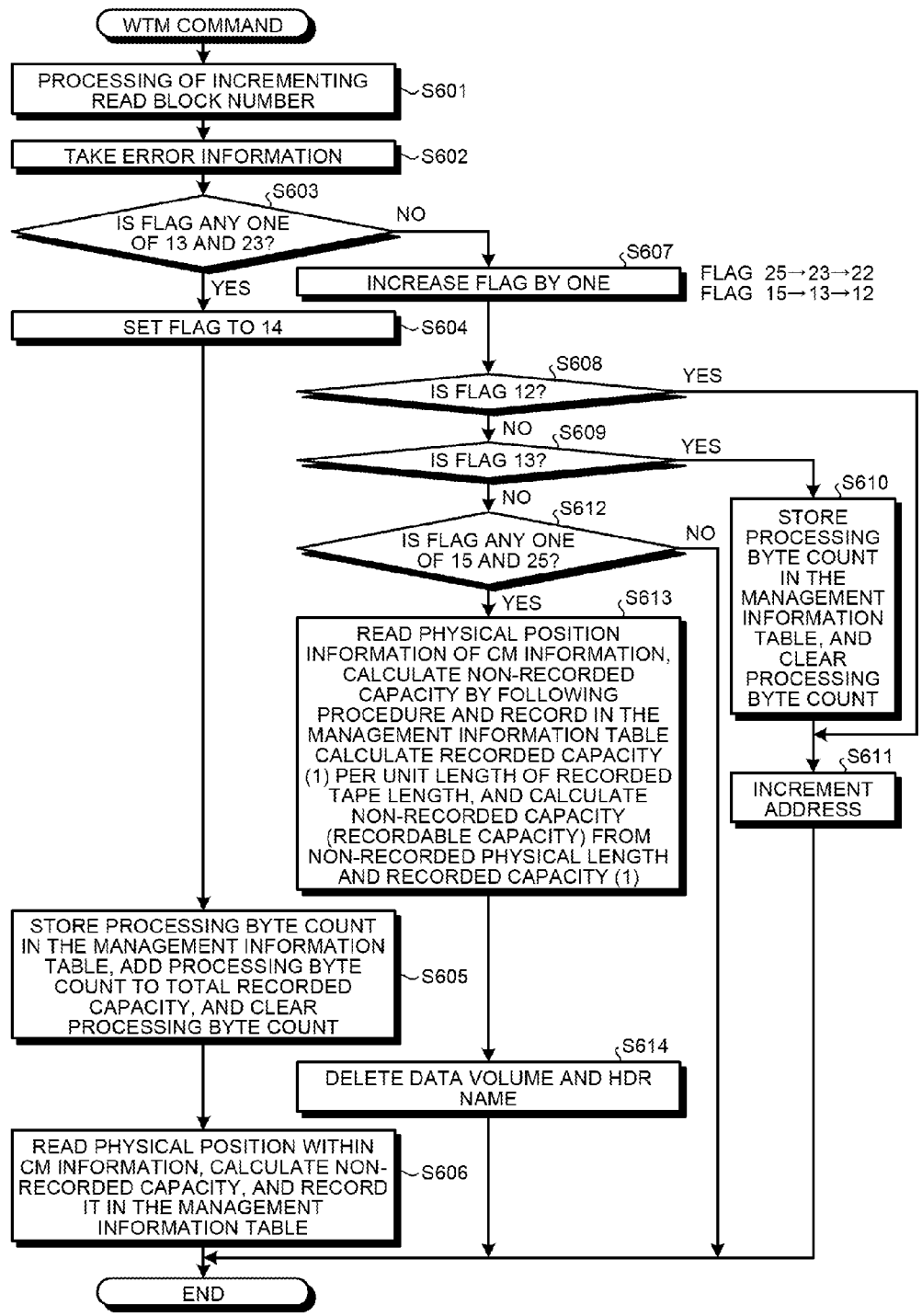
FIG. 19 is a flowchart illustrating the procedure of WTM command processing performed by the tape device according to the first embodiment.

FIG. 19 is a flowchart illustrating the procedure of the WTM command processing performed by the tape device according to the first embodiment. As illustrated in FIG. 19, the tape device 100 increments the read block number (Step S601). Subsequently, the tape device 100 takes WTM error information from the drive unit 120 (Step S602). In addition, the processing of Step S601 and Step S602 is the WTM processing.

Subsequently, the tape device 100 determines whether the status flag is any one of 13 and 23 (Step S603). When it is determined that the status flag is any one of 13 and 23 (Yes in Step S603), the tape device 100 sets the status flag to 14 (Step S604). Subsequently, the tape device 100 stores processing bytes, and a value obtained by adding the processing bytes to the total recorded capacity in the management information table 133*a*, and clears the processing byte count (Step S605).

Subsequently, the tape device 100 reads the recorded physical position within CM information, calculates the non-recorded capacity, and records the calculated non-recorded capacity in the management information table 133*a* (Step S606). For example, the tape device 100 calculates a recorded capacity per unit length of the recorded tape length from the recorded physical position of the CM information, and calculates the non-recorded capacity from the non-recorded physical length and the recorded capacity. Here, the term "non-recorded capacity" means capacity further recordable on a medium. The tape device 100 ends the WTM command processing after the completion of Step S606.

When it is determined that the status flag is neither 13 nor 23 (No in Step S603), the tape device 100 changes the status flag to a status flag obtained by adding 1 to the current status flag (Step S607). Subsequently, the tape device 100 determines whether the status flag is (Step S608).

Here, when it is determined that the status flag is not 12 (No in Step S608), the tape device 100 determines whether the status flag is 13 (Step S609). Here, when it is determined that the status flag is 13 (Yes in Step S609), the tape device 100 records a processing byte count in the management information table 133*a* and clears the processing byte count (Step S610).

When it is determined that the status flag is 12 (Yes in Step S608), the tape device 100 increments the address in the management information table after the completion of the processing of Step S610 (Step S611), and ends the WTM command processing.

Here, when it is determined that the status flag is not 13 (No in Step S609), the tape device 100 determines whether the status flag is any one of 15 and 25 (Step S612). When it is determined that the status flag is neither 15 nor 25 (No in Step S612), the tape device 100 ends the WTM command processing.

On the other hand, when it is determined that the status flag is any one of 15 and 25 (Yes in Step S612), the tape device 100 reads the recorded physical position of the CM information, calculates the non-recorded capacity, and records the calculated non-recorded capacity in the management information table 133*a* (Step S613). For example, the tape device 100 calculates the recorded capacity per unit length of the recorded tape length from the recorded physical position of the CM information, and calculates the non-recorded capacity from the non-recorded physical length and the recorded capacity. Here, the term "non-recorded capacity" means capacity further recordable on a medium.

Subsequently, the tape device 100 deletes the HDR name and the data volume in the management information table 133a (Step S614). For example, the tape device 100 records ALLO by associating the HDR name of the management information table 133a with the data volume. The tape device 100 ends the WTM command processing after the completion of Step S614.

RWD Command Processing

Figure 20:
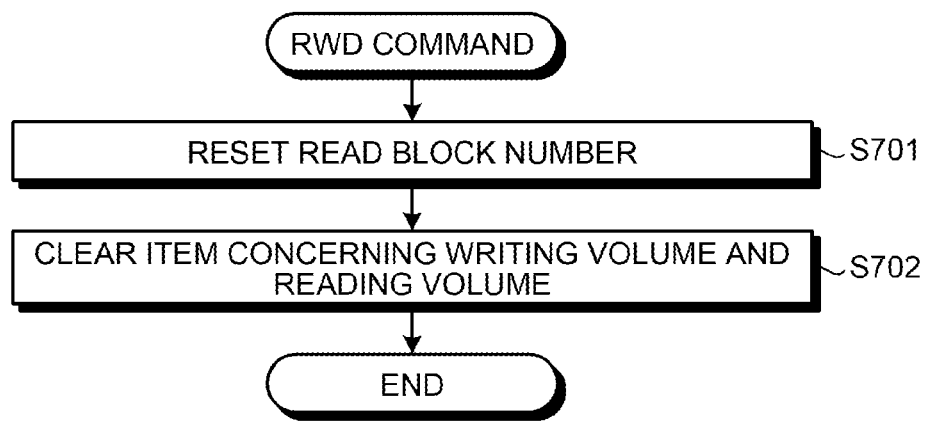
FIG. 20 is a flowchart illustrating the procedure of RWD command processing performed by the tape device according to the first embodiment.

FIG. 20 is a flowchart illustrating the procedure of the RWD command processing performed by the tape device according to the first embodiment. As illustrated in FIG. 20, the tape device 100 resets the read block number (Step S701). Subsequently, the tape device 100 clears items concerning writing volume and reading volume (Step S702). That is, the tape device 100 clears the processing byte count and the status flag. The tape device 100 ends the RWD command processing.

SDIAG Command Processing

FIG. 21 is a flowchart illustrating the procedure of the SDIAG command processing performed by the tape device according to the first embodiment. As illustrated in FIG. 21, the tape device 100 executes analysis processing on each diagnosis item (Step S801). Subsequently, the tape device 100 transmits diagnostic data to the drive unit 120 (Step S802), and starts executing diagnosis (Step S803).

The tape device 100 determines whether the recorded data volume and the non-recorded capacity are required (Step S804). Here, when it is determined that the recorded data volume and the non-recorded capacity are required (Yes in Step S804), the tape device 100 searches for the VOL name (Step S805). Here, when it is determined that neither the recorded data volume nor the non-recorded capacity are required (No in Step S804), the tape device 100 ends the SDIAG command processing.

The tape device 100 determines whether searching the management information table 133a for the VOL name is finished (Step S806). When it is determined that the searching of the management information table 133a for the VOL name is finished (Yes in Step S806), the tape device 100 prepares for transmission of the HDR name, and performs EBSDIC conversion of the data volume (Step S807). When it is determined that the searching of the management information table 133a for the VOL name is not finished (No in Step S806), the processing of the tape device 100 proceeds to Step S805.

Then, the tape device 100 transmits data to the host (Step S808), and then determines whether all data is transmitted (Step S809). Here, when it is determined that not all of the data is transmitted (No in Step S809), the processing of the tape device 100 proceeds to S807.

When it is determined that all the data is transmitted (Yes in Step S809), the tape device 100 performs the EBSDIC conversion of the total recorded capacity and the non-recorded capacity (Step S810), and transmits the result to the host (Step S811).

The tape device 100 determines whether the processing concerning the specified VOL name is completed (Step S812). When it is determined that the processing concerning the specified VOL is not completed (No in Step S812), the processing of the tape device 100 proceeds to Step S805.

On the other hand, the tape device 100 ends the SDIAG command processing when the processing concerning the specified VOL is completed (Yes in Step S812).

Advantages of First Embodiment

As described above, the tape device 100 according to the first embodiment measures the data volume processed whenever it executes the command, and stores a tape remaining quantity calculated from the physical position of the tape and the total processed data volume. As a result, the tape device 100 according to the first embodiment can efficiently manage the tape remaining quantity, without loading a tape to a drive.

For example, without needing to load the cartridge medium on the drive 121 in the tape device 100 according to the first embodiment, the host can recognize the recorded data volume and the non-recorded data volume of the corresponding volume which is stored in the management information table 133a. For this reason, time for managing the non-recorded data volume of the cartridge medium does not occur.

The tape device 100 according to the first embodiment can determine whether the data which will be written can be accommodated in a non-recorded physical area when a non-recorded data volume in a cartridge medium is reduced for some reasons such as writing error which occurs while file data is being written in the cartridge medium.

[b] Second Embodiment

Incidentally, the present invention may be embodied in various different embodiments besides the above-described embodiment. Accordingly, a second embodiment describes other examples that falls under the present invention.

System Configuration and Others

All or part of the processing described above as what is automatically performed among each processing described in the embodiment can also be performed in manual. Or all or part of the processing described as what is performed in manual can also be automatically performed by a well-known method. In addition, the processing procedure, the control procedure, and the specific names which are stated and illustrated in the above context and the drawings may vary arbitrarily unless otherwise specifically stated.

Moreover, each unit of the configuration illustrated is a conceptual functional unit. Therefore, it is not necessarily configured physically in the same way as illustrated. For example, in the tape device 100, the calculating unit 205 and the updating unit 206 may be combined. The whole or arbitrary part of each processing function carried out by each device may be realized by a CPU and a program which is analyzed and executed by the CPU, or may be realized by wired-logic hardware.

According to the embodiments, the recorded data volume of a cartridge medium is efficiently manageable.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tape device comprising:
a memory; and
a processor coupled to the memory, wherein the memory stores management information in which an identifier of a medium and a data volume further recordable on the medium are in association with each other and
the processor executes a process comprising:
measuring a data volume written in the medium or a data volume read out of the medium according to execution of an input/output command;
calculating a data volume recorded on the medium from a total of the data volume measured at the measuring;
acquiring a recorded medium length, which represents a length of the medium up to an end position of the data written in or read out of the medium by the execution of the input/output command from a beginning position of the medium, the length of the medium being measured using a position of a head to the medium, from a drive to which the medium is mounted without loading the medium to the drive;
calculating the data volume further recordable on the medium, based on the recorded data volume and the recorded medium length; and
updating the management information stored in the memory with the data volume further recordable on the medium calculated at the calculating, wherein
the measuring includes measuring the data volume written in the medium or the data volume read out of the medium whenever the input/output command is executed.

2. The tape device according to claim 1,
wherein, when finish information, which represents end of writing of data, is written in or read out by the execution of the input/output command, the calculating includes calculating a recorded data volume per length of the medium from the recorded medium length and the recorded data volume, and calculates the data volume further recordable on the medium from the calculated recorded data volume per length of the medium and a length of a non-recorded portion of the medium.

3. The tape device according to claim 1, wherein the process further comprising:
determining whether the medium is an unused one based on presence or absence of information containing the identifier of the medium when the medium is mounted; and
generating the management information in which the identifier of the medium and the data volume further recordable on the medium are in association with each other when the determining determines that the medium is the unused one.

4. The tape device according to claim 3,
wherein the determining includes reading the identifier of the medium and searching for the management information that matches the read identifier of the medium when it is determined that the medium is not the unused one, and
the updating includes updating the management information with the data volume further recordable on the medium calculated at the calculating when there is the management information that matches the read identifier of the medium as a result of the searching at the determining.

5. The tape device according to claim 4,
wherein the generating includes generating the management in which the identifier of the medium and the data volume further recordable on the medium are in association with each other when there is no management information that matches the read identifier of the medium as a result of the searching at the determining.

6. The tape device according to claim 1, wherein the process further comprising:
reading the management information from the storage unit; and
transmitting the read management information to an information processor when an acquisition request of the management information is received from the information processor.

7. A method of controlling a tape device, the method comprising:
measuring a data volume written in a medium or a data volume read out of the medium according to execution of an input/output command;
calculating a data volume recorded on the medium from a total of the data volume measured;
acquiring a recorded medium length, which represents a length of the medium up to an end position of data written in or read out of the medium by the execution of the input/output command from a beginning position of the medium, the length of the medium being measured using a position of a head to the medium, from a drive to which the medium is mounted without loading the medium to the drive;
calculating a data volume further recordable on the medium based on the recorded medium length and the recorded data volume; and
updating management information stored in a storage unit which stores the management information in which an identifier of a medium and a data volume further recordable on the medium are in association with each other with the data volume further recordable on the medium which is calculated at the data volume calculating, wherein
the measuring includes measuring the data volume written in the medium or the data volume read out of the medium whenever the input/output command is executed.

* * * * *